(12) United States Patent
Kim et al.

(10) Patent No.: US 7,885,236 B2
(45) Date of Patent: *Feb. 8, 2011

(54) METHOD OF INITIALIZING AND ESTABLISHING LINKS IN A MULTI-MODE MOBILE TERMINAL

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/756,908

(22) Filed: Apr. 8, 2010

(65) Prior Publication Data

US 2010/0261475 A1    Oct. 14, 2010

Related U.S. Application Data

(63) Continuation of application No. 11/402,512, filed on Apr. 11, 2006, now Pat. No. 7,738,425.

(30) Foreign Application Priority Data

Apr. 11, 2005  (KR) .................... 10-2005-0030122

(51) Int. Cl.
*H04W 4/00* (2009.01)
(52) U.S. Cl. .................. 370/331; 370/336; 370/332; 370/311; 370/328; 455/436; 455/437; 455/418; 455/444
(58) Field of Classification Search ................ 370/331, 370/338, 332, 328, 311; 455/436, 437, 418, 455/444
See application file for complete search history.

(56) References Cited

U.S. PATENT DOCUMENTS 7,496,364 B2    2/2009  Hoghooghi et al.

(Continued)

FOREIGN PATENT DOCUMENTS

| WO | 03/065654 A1 | 8/2003 |
|---|---|---|
| WO | 2004/031488 A2 | 4/2004 |
| WO | 2004/477867 A2 | 9/2004 |

OTHER PUBLICATIONS

Anjum, F. et al.: "A Proposal for MIH Function and Information Service", IEEE 802.21 Working Group, Jan. 10, 2005, Retrieved from the Internet:<URL:http://www.ieee802.org/21/doctree/2005-01_meeting_docs/21-04-0165-03-0000-Telcordia_Toshiba_Proposal.pdf>.

(Continued)

*Primary Examiner*—Charles N Appiah
*Assistant Examiner*—Kwasi Karikari
(74) *Attorney, Agent, or Firm*—Lee, Hong, Degerman, Kang & Waimey

(57) ABSTRACT

A method of performing a handover with at least one of a homogeneous and heterogeneous network is disclosed. More specifically, the method comprises establishing a heterogeneous network handover module for converging information from the at least one network interface module associated with the at least one of a homogeneous and heterogeneous network into a unified presentation and receiving a message for powering on at least one network interface module in a mobile terminal from the heterogeneous network handover module. The method further comprises performing a power on operation for activating the at least one network interface module and transmitting a confirmation message for indicating a power on operation status to the heterogeneous network handover module.

27 Claims, 19 Drawing Sheets

U.S. PATENT DOCUMENTS

| | | | |
|---|---|---|---|
| 7,738,425 B2* | 6/2010 | Kim et al. | 370/338 |
| 2004/0114553 A1* | 6/2004 | Jiang et al. | 370/328 |
| 2005/0248161 A1 | 11/2005 | Heidel | |
| 2006/0092864 A1 | 5/2006 | Gupta et al. | |
| 2006/0094431 A1 | 5/2006 | Saifullah et al. | |
| 2006/0140150 A1* | 6/2006 | Olvera-Hernandez et al. | 370/331 |
| 2006/0221899 A1 | 10/2006 | Feder et al. | |
| 2006/0259598 A1 | 11/2006 | Kim et al. | |

OTHER PUBLICATIONS

Koh, B. et al.: "Panasonic's MIH Proposal (Details)", IEEE 802.21 Working Group, Jan. 10, 2005, Retrieved from the Internet: <URL:http://www.ieee802.org/21/doctree/2005-01_meeting_docs/21-05-0206-00-0000-Panasonic MIH_Proposal.ppt>.

Carlton, A. et al.: "Media Independent Handover Functions and Services Specification", IEEE 802.21 Working Group, Jan. 9, 2005, Retrieved from the Internet: <URL:http://www.ieee802.org/21/doctree/2005-01_meeting_docs?21-05-0203-00-0000-InterDigital.doc>, XP002426057.

Mitani, K. et al.: "Unified L2 Abstractions for L3-Driven Fast Handover;" Internet Engineering Task Force (IETF) Standard-Working Draft, draft-koki-mobopts-l2-abstractions-02.txt, No. 2, Feb. 21, 2005, XP015043090.

* cited by examiner

METHOD OF INITIALIZING AND ESTABLISHING LINKS IN A MULTI-MODE MOBILE TERMINAL

CROSS REFERENCE TO RELATED APPLICATIONS

This application is a continuation of U.S. application Ser. No. 11/402,512, filed Apr. 11, 2006, now U.S. Pat. No. 7,738, 425, which claims the benefit of Korean Application No. 10-2005-0030122, filed on Apr. 11, 2005, which are all hereby incorporated by reference herein in their entirety.

BACKGROUND OF THE INVENTION

1. Field of the Invention

The present invention relates to a method of initializing and establishing links, and more particularly, to a method of initializing and establishing links in a multi-mode mobile terminal.

2. Discussion of the Related Art

FIG. 1 is a diagram showing a Protocol Stack Architecture according to IEEE 802.16. As shown in FIG. 1, conversion or mapping of the data, received from the outside communication network via the CS Service Access Point (SAP), to MAC Service Data Unit (SDU), received by a MAC Common Part Sublayer (CPS) via the MAC SAP can take place at a Service-Specific Convergence Sublayer (CS). Here, the SDUs of the outside communication network are classified and assigned to corresponding MAC Service Flow Identifier (SFID) or Connection Identifier (CID). For a diverse protocol interface, provisions related to a multiple CS are provided. The internal format of the CS payload is considered a unique characteristic of the CS. Moreover, the MAC CPS is not required to analyze or comprehend the format of any information received after the CS payload.

The MAC CPS provides features such as system access, allocation of broadband width, establishing access, and access management. Moreover, the MAC CPS receives data, classified by a specific MAC access method, from various CS via the MAC SAP. Furthermore, the data is transmitted through the PHY layer while Quality of Service (QoS) is applied to the scheduling feature.

The PHY control and statistical data from between the MAC CPS and the PHY is transmitted via the PHY SAP. In the definition of the PHY, there are various provisions and is appropriate in each specific frequency range and application.

FIG. 2 illustrates the protocol stack architecture of IEEE 802.11, and FIG. 3 illustrates the protocol stack architecture of $3^{rd}$ Generation Partnership Project (3GPP).

In IEEE 802.21, discussions are under way to establish an international standard for a Media Independent Handover (MIH) between heterogeneous networks. One of the objects of the international standard is to provide seamless handover and service continuity to enhance user experience of mobile devices. As a basic requirement, there are a MIH function, an event trigger, a Command Service (CS) and an Information Service (IS).

A mobile terminal is a multi modal which supports at least one interface type, and the interface types can be any one of the following. The interface types include a wire-line type similar an Ethernet of IEEE 802.3, a wireless interfaces based on IEEE 802.xx (e.g., 802.11, 802.15, 802.16), and an interface defined by a cellular standard organization (e.g., $3^{rd}$ Generation Partnership Program (3GPP), $3^{rd}$ Generation Partnership Program 2 (3GPP2)).

The MIH is defined between the IEEE 802 series interfaces or between the IEEE802 series interfaces and non-IEEE 802 series interfaces (e.g., 3GPP, 3GPP2). Furthermore, the MIH has to be supported by upper layer mobile support protocol such as a Mobile Internet Protocol (Mobile IP) and a Session Initiation Protocol (SIP) in order to provide seamless handover and uninterrupted service.

FIG. 4 illustrates a general MIH reference model used to support MIH function. The SAP for supporting the MIH function is as follows.

MIH_MGMTSAP defines the interface between the MIH function stack and the management plane. MIH_MGMT_SAP can be used to send the MIH messages to peer MIH entities. The messages near the management frame can be sent without authentication. MIH_MGMT_SAP indicates the primitives used by Media Independent Event Services, Media Independent Command Services, and Media Independent Information Services.

MIH_SME_SAP defines the interface between the MIH function stack and a Station Management Entity (SME) of IEEE 802.11 or between MIH function stack and a Network Control and Management System (NCMS) of IEEE 802.16. Furthermore, MIH_SME_SAP can be same as MIH_MGMT_ SAP.

MIH_USER_SAP defines the interfaces for communicating with the layers above the upper layers (e.g., IP layer—Layer 3).

MIH_MAC_SAP defines the interface between the MIH and the MAC of other interfaces. The other interfaces include, for example, IEEE 802.11, IEEE 802.16, 3GPP, and 3GPP2. The interfaces indicated by MIH_MAC_SAP are used to transmit between peer entities. Here, no new interfaces and primitives need to be defined for MIH_MAC_SAP. However, the interfaces indicated by MIN_MAC_SAP can be used by the peer MIH entities to transmit the payloads near the MIH protocol.

MIH_PHY_SAP defines the interface between the MIH and the PHY layer of other interfaces (e.g., IEEE 802.11, IEEE 802.16, 3GPP, and 3GPP2). Here, the MIH uses the MACs of the corresponding interface to communicate via the PHY of the corresponding interface. There is no need to define new interfaces or primitives for MIH_PHY_SAP.

A Layer SAP (LSAP) defines the interface between the MIH and a Lower Link Control (LLC) of other interfaces. The MIH establishes connection and communicates with the peer LLC entities. Thereafter, the MIH uses the LLC interface directly to establish data path for transmitting MSDUs via other links. Here, there is no need to define new interfaces or primitives for LSAP.

MIH_RRC_SAP defines the interface between the MIH function and the interfaces between a Radio Resource Control (RRC) of other interfaces.

The MIH function is placed below the IP layer. The MIH function facilitates the handover handling process by using the input values from Layer 2 such as trigger event information and information of other networks. Moreover, the MIH Function can include input values (e.g., user policy and configuration) which can affect the handover procedure. In addition, general interfaces (e.g., the Mobile IP and the SIP) are defined between Layer 3 entities and the MIH Function. These interfaces provide information associated with Layer 1 (i.e., PHY Layer) and Layer 2 (i.e., MAC Layer) as well as mobility management. The MIH acquires information on lower layer and the network with the aid of the ES and the IS.

Furthermore, in the upper layer, the mobile terminal should include the MIH function for monitoring and controlling the status of other links. FIG. 5 illustrates a mobile terminal having the MIH function and a functional entity and transmission protocol of a network. In FIG. 5, the dotted lines represent services such as a primitive and the event trigger.

FIG. 6 illustrates a configuration of an IEEE 802.16 system in a protocol stack considering the MIH. This model can be applied to both the mobile terminal and the network. However, because a multi-mode mobile subscriber station and a multi-stack mobile subscriber station should be taken into consideration, a mobile subscriber station should include the configuration shown in FIG. 6.

FIG. 7 illustrates a configuration of an IEEE 802.11 system in a protocol stack considering the MIH. This model can be applied to both the mobile terminal and the network. However, because a multi-stack mobile subscriber station of multi-mode should be taken into consideration, a mobile subscriber station should include the configuration shown in FIG. 7.

FIG. 8 illustrates a configuration of a 3GPP system in a protocol stack considering the MIH. This model can be applied to both the mobile terminal and the network. However, because a multi-stack mobile subscriber station of multi-mode should be taken into consideration, a mobile subscriber station should include the configuration shown in FIG. 8.

According to the conventional art, there is no way to initialize and establish control link in a multi-mode mobile terminal having at least two interface types associated with the wired or wireless schemes. In particular, if placed in the MIH stack, there is no way to establish link for operating the mobile terminal and accessing the network and to control each interface of the multi-mode mobile terminal. As such, there are delays in operating the mobile terminal and accessing the network. Moreover, since power of the multi-mode mobile terminal could not be managed, power consumption by the multi-mode mobile terminal was excessive.

SUMMARY OF THE INVENTION

Accordingly, the present invention is directed to a method of initializing and establishing links in a multi-mode mobile terminal that substantially obviates one or more problems due to limitations and disadvantages of the related art.

An object of the present invention is to provide a method of performing a handover with at least one of a homogeneous and heterogeneous network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing a handover with at least one of a homogeneous and heterogeneous network includes establishing a heterogeneous network handover module for converging information from the at least one network interface module associated with the at least one of a homogeneous and heterogeneous network into a unified presentation. The method further includes receiving a message for powering on at least one network interface module in a mobile terminal from the heterogeneous network handover module, performing a power on operation for activating the at least one network interface module, and transmitting a confirmation message for indicating a power on operation status to the heterogeneous network handover module.

In another aspect of the present invention, a method of performing handover with at least one of a homogeneous and heterogeneous network includes establishing a heterogeneous network handover module for converging information from the at least one network interface module associated with the at least one of a homogeneous and heterogeneous network into a unified presentation. The method further includes receiving a message for powering down at least one network interface module in a mobile terminal from the heterogeneous network handover module, performing powering down operation for deactivating the at least one network interface module, and transmitting a confirmation message for indicating a power down operation status to the heterogeneous network handover module.

Yet in another aspect of the present invention, a method of performing a handover to at least one of a homogeneous and heterogeneous network includes establishing a heterogeneous network handover module for converging information from the at least one network interface module associated with the at least one of a homogeneous and heterogeneous network into a unified presentation. The method further includes receiving a message for powering on at least one network interface module in a mobile terminal from a management module, transmitting a message for powering on the at least one network interface module in the mobile terminal from the heterogeneous network handover module to the at least one network interface module in a mobile terminal, and receiving a confirmation message for indicating a power on operation status from the at least one network interface module.

In a further aspect of the present invention, a method of performing a handover to at least one of a homogeneous and heterogeneous network includes establishing a heterogeneous network handover module for converging information from the at least one network interface module associated with the at least one of a homogeneous and heterogeneous network into a unified presentation. The method further includes receiving a message for powering down at least one network interface module in a mobile terminal from a management module, transmitting a message for powering down the at least one network interface module in the mobile terminal from the heterogeneous network handover module to the at least one network interface module in a mobile terminal, and receiving a confirmation message for indicating a power down operation status from the at least one network interface module.

In another aspect of the present invention, a method of performing a handover to at least one of a homogeneous and heterogeneous network includes establishing a heterogeneous network handover module for converging information from at least one network interface module associated with the at least one of a homogeneous and heterogeneous network into a unified presentation. The method further includes receiving from a management module a command for establishing at least one connection with at least one network interface module, performing a connection establishment procedure by transmitting a setup message for establishing the at least one connection to the at least one network interface module in a mobile terminal and receiving a result message for indicating a setup result from the at least one of the network interface module, and transmitting a notification message for providing the management module with the results of the connection establishment procedure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention defines a service access point (SAP) to support a media independent handover function (MIH). It may be classified by the existence or non-existence of an MIH convergence sublayer (MIH CS) according to message distribution and an MIH function range. The existence of the MIH CS can be additionally divided into an MIH lower convergence sublayer and an MIH higher convergence sublayer. The MIH CS is configured across all interface types of a multi-stack provided to a terminal. The MIH CS deals with policy enforcement, network selection, QoS parameter mapping, handover signaling and the like. Preferably, the object of the MIH CS is to act as a connection between a higher protocol and a lower MIH to facilitate equal application among different technologies regardless of the technologies' features dependent on media. Preferably, the technologies comprise at least one of a wired-line broadband system, a wireless broadband system and a cellular system. Preferably, the broadband system comprises at least one of a wireless local area network and a wireless metropolitan area network. Preferably, the cellular system comprises at least one of WCDMA and a cdma2000.

In the embodiments of the present invention, the term 'link establishment' and any variations thereof can be used interchangeably with a term 'link setup' and its variations. In addition, a term 'entity' can also be referred to as a 'module.' For example, a management entity can be referred to as a management module.

FIGS. 9-12 illustrate examples of protocol stacks to which a method of initializing and establishing link in a multi-mode mobile terminal can be applied according to the present invention. The present invention can be made available to support handover between heterogeneous networks including wired and wireless networks. In particular, the present invention relates to a multi-mode mobile terminal having at least two multiple wired and/or wireless interface types (e.g., Ethernet, wireless LAN, broadband radio access system, and cellular system).

Figure 1:
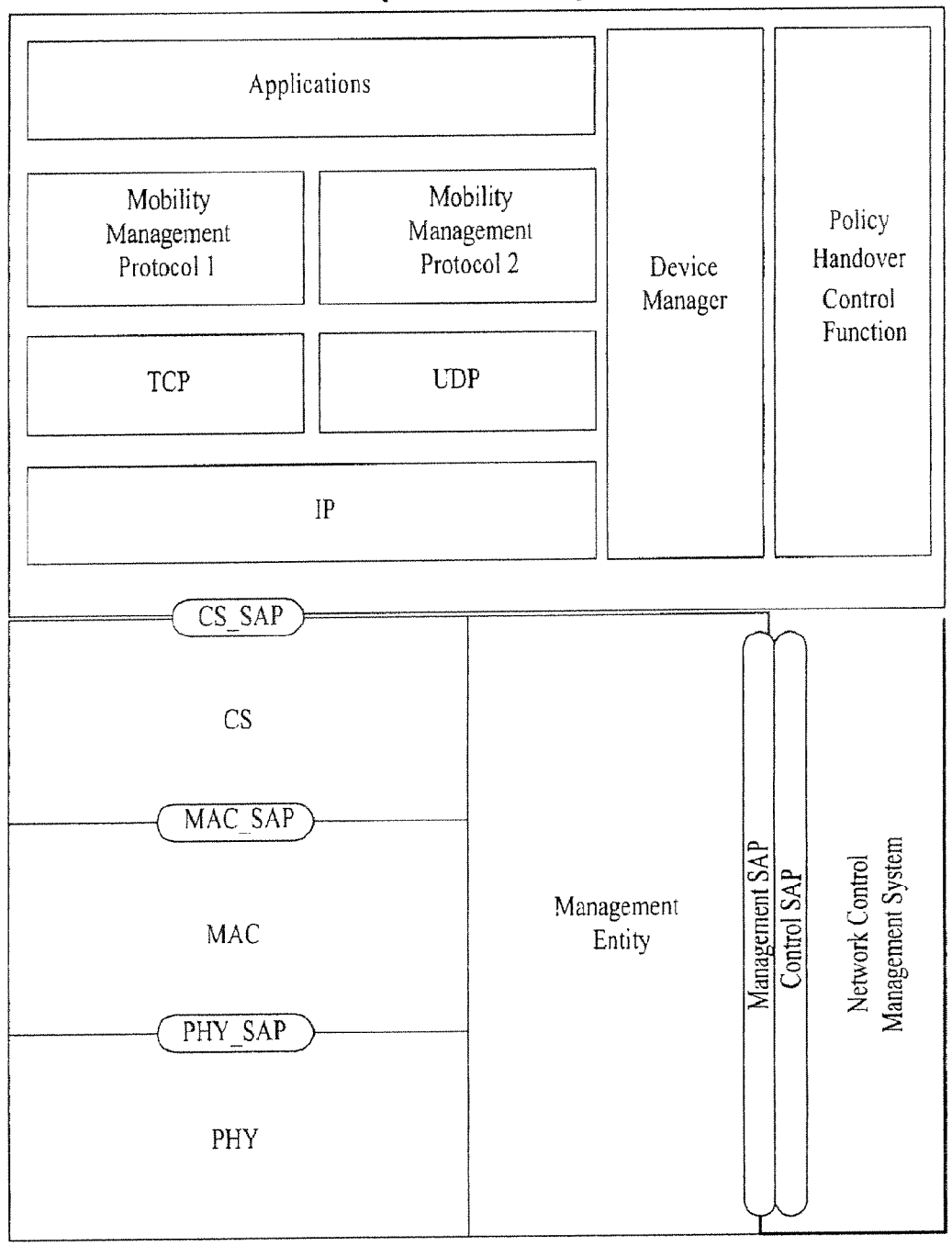
FIG. 1 is a diagram showing a Protocol Stack Architecture according to IEEE 802.16.
Figure 2:
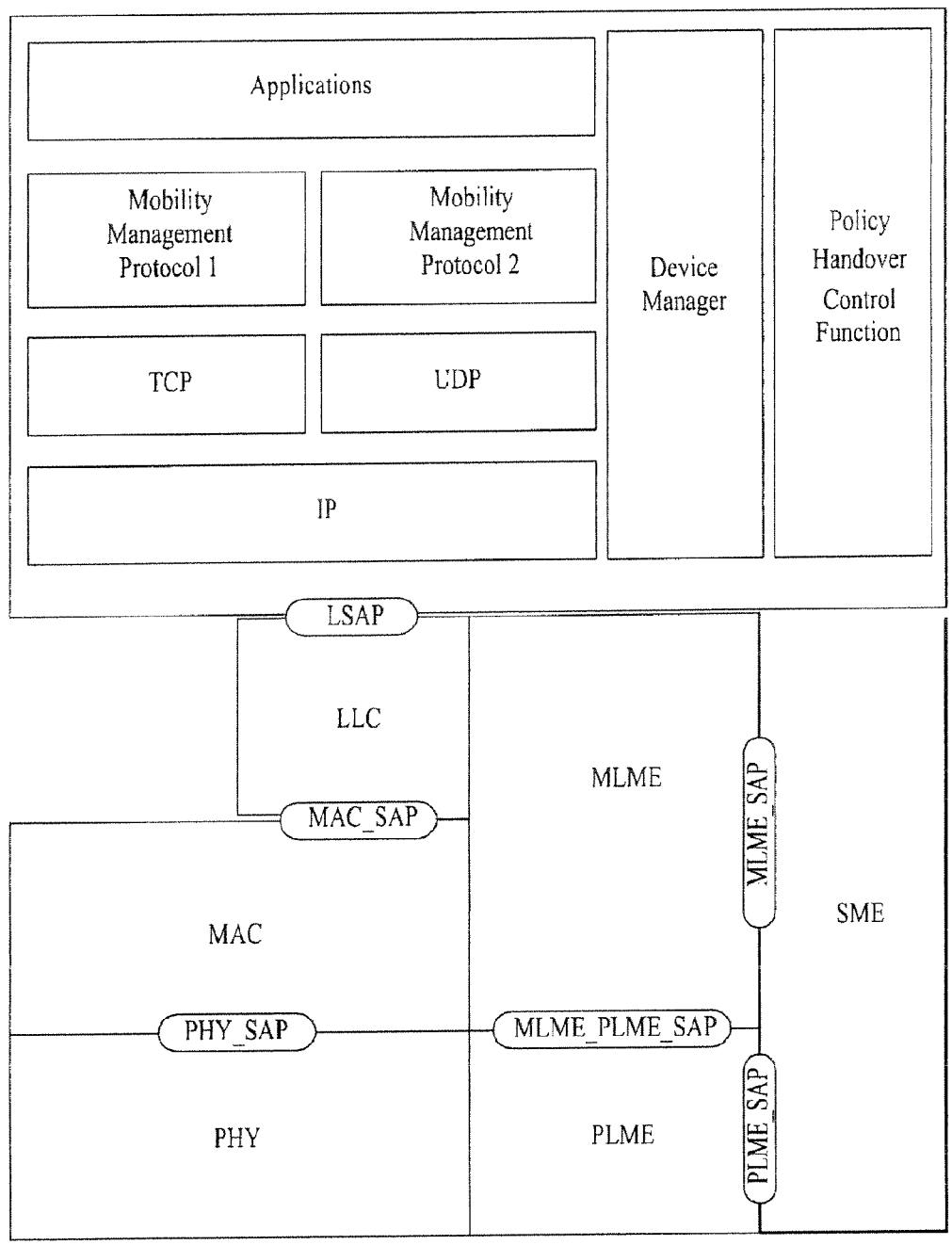
FIG. 2 illustrates the protocol stack architecture of IEEE 802.11.
Figure 3:
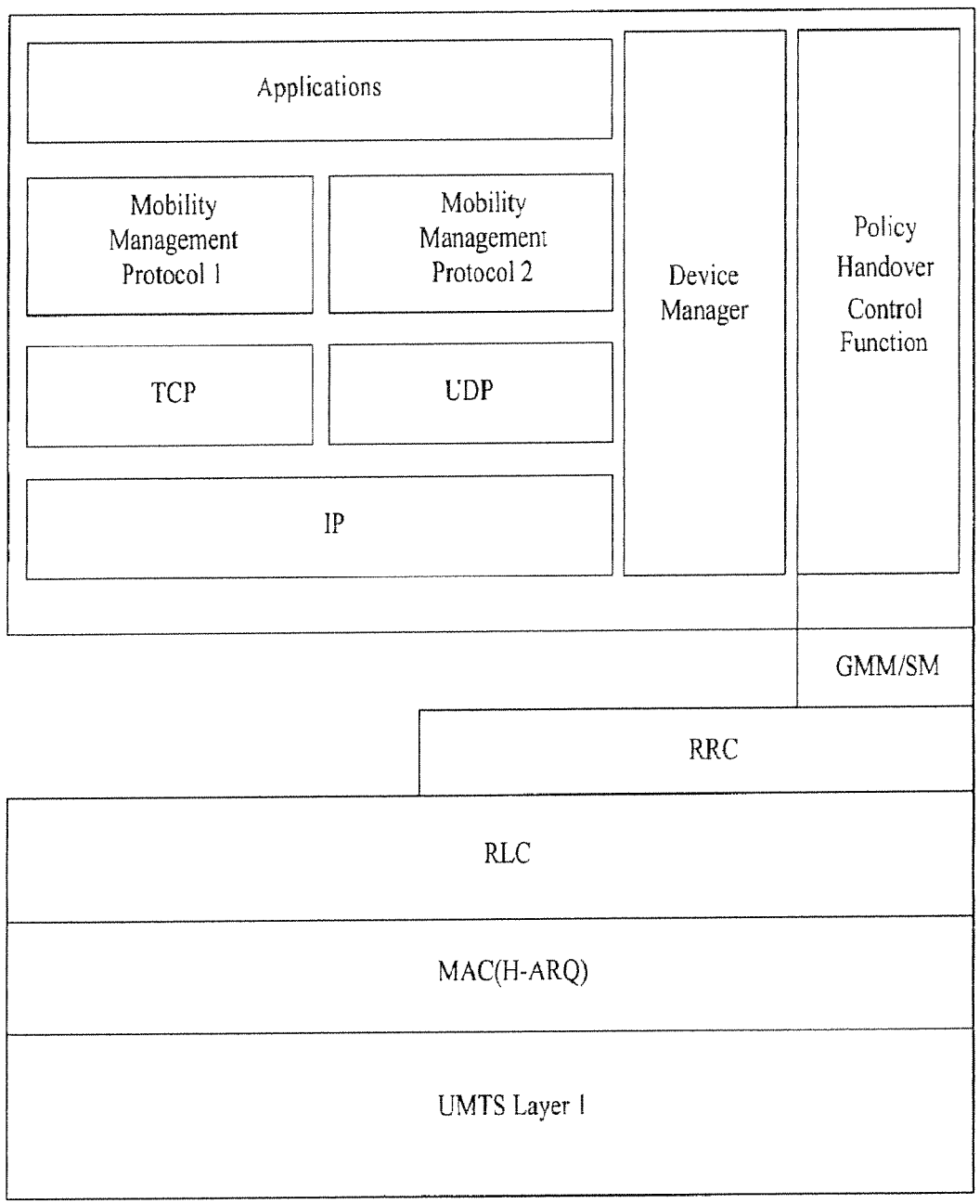
FIG. 3 illustrates the protocol stack architecture of 3$^{rd}$ Generation Partnership Project (3GPP)
Figure 4:
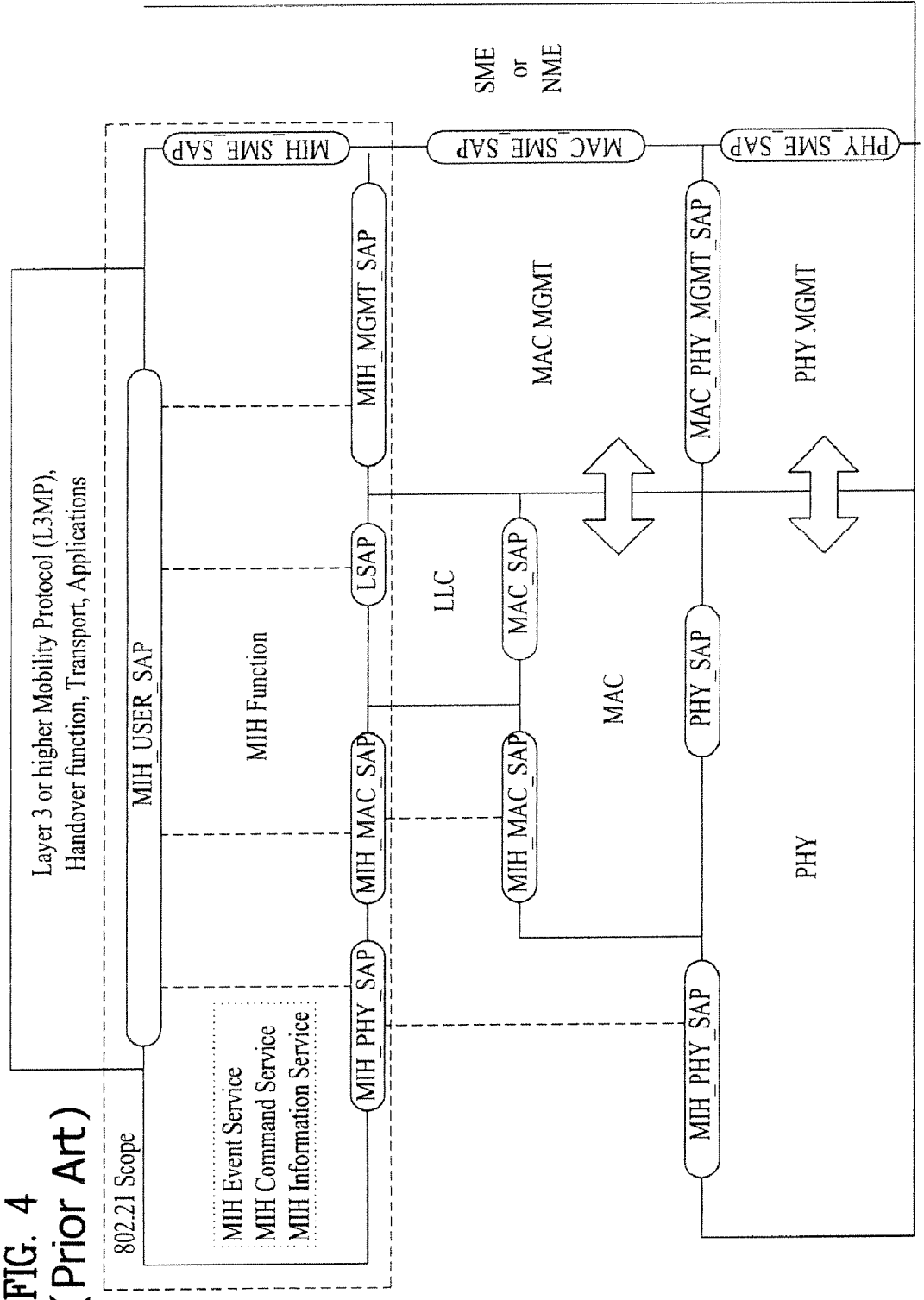
FIG. 4 illustrates a general MIH reference model used to support MIH function.
Figure 5:
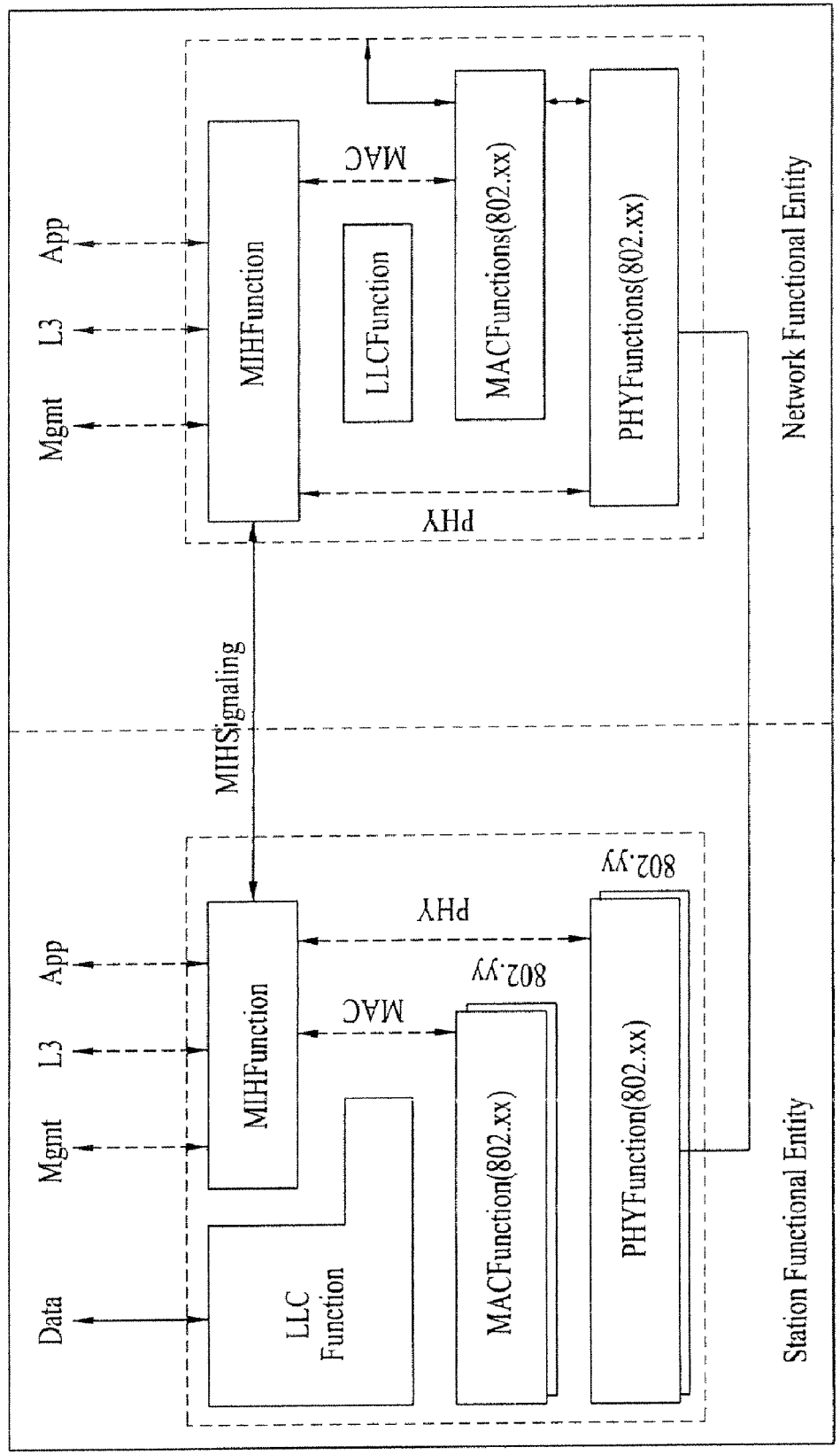
FIG. 5 illustrates a mobile terminal having the MIH function and a functional entity and transmission protocol of a network.
Figure 6:
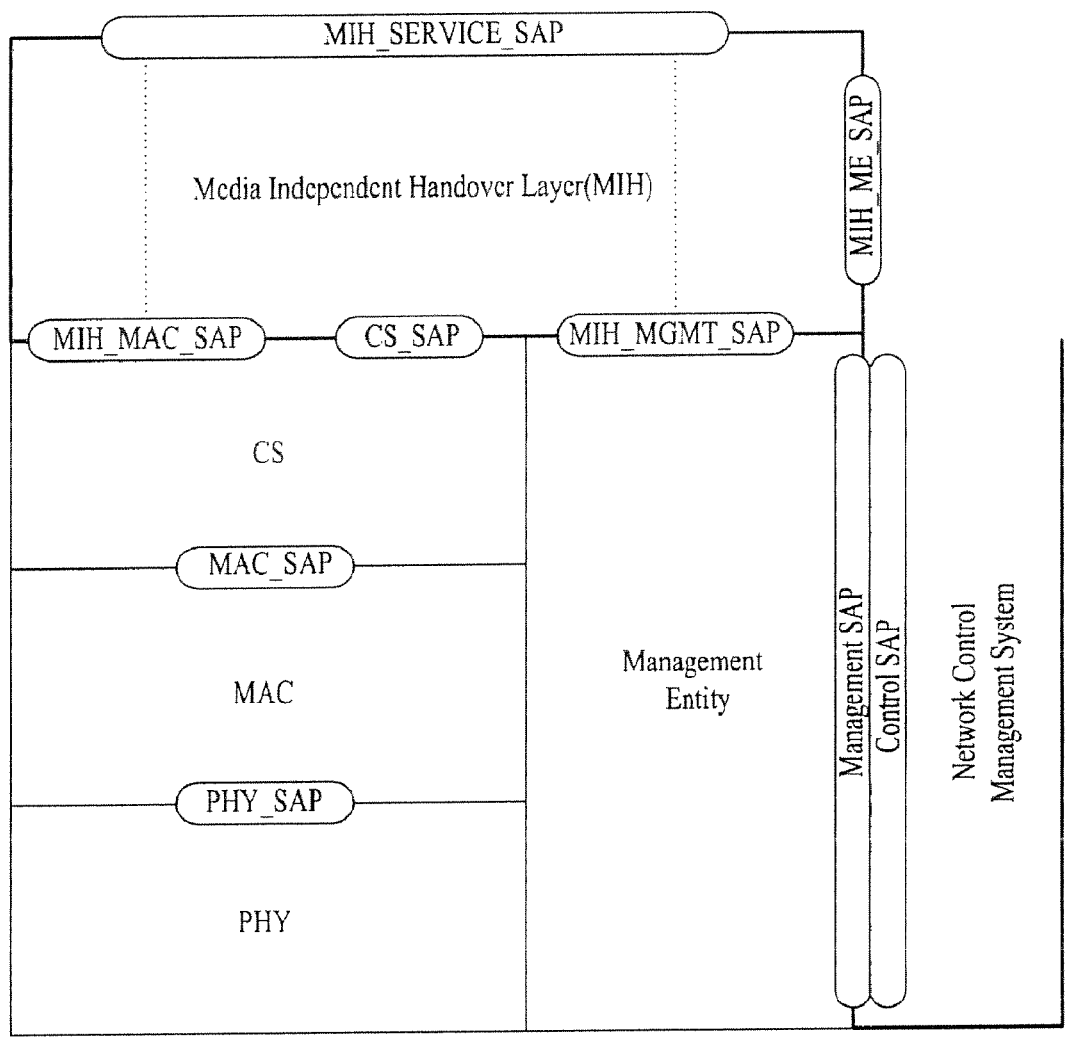
FIG. 6 illustrates a configuration of an IEEE 802.16 system in a protocol stack considering the MIH.
Figure 7:
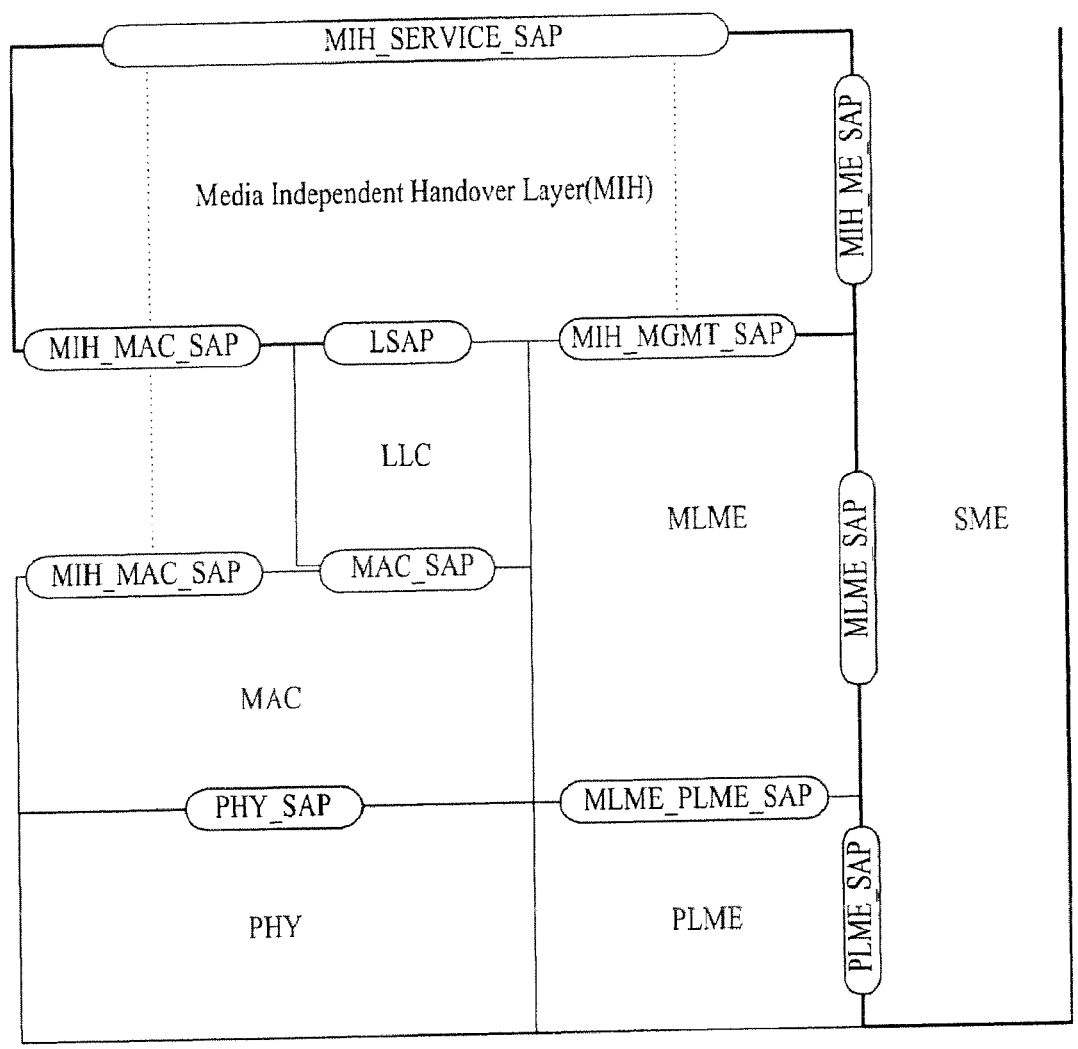
FIG. 7 illustrates a configuration of an IEEE 802.11 system in a protocol stack considering the MIH.
Figure 8:
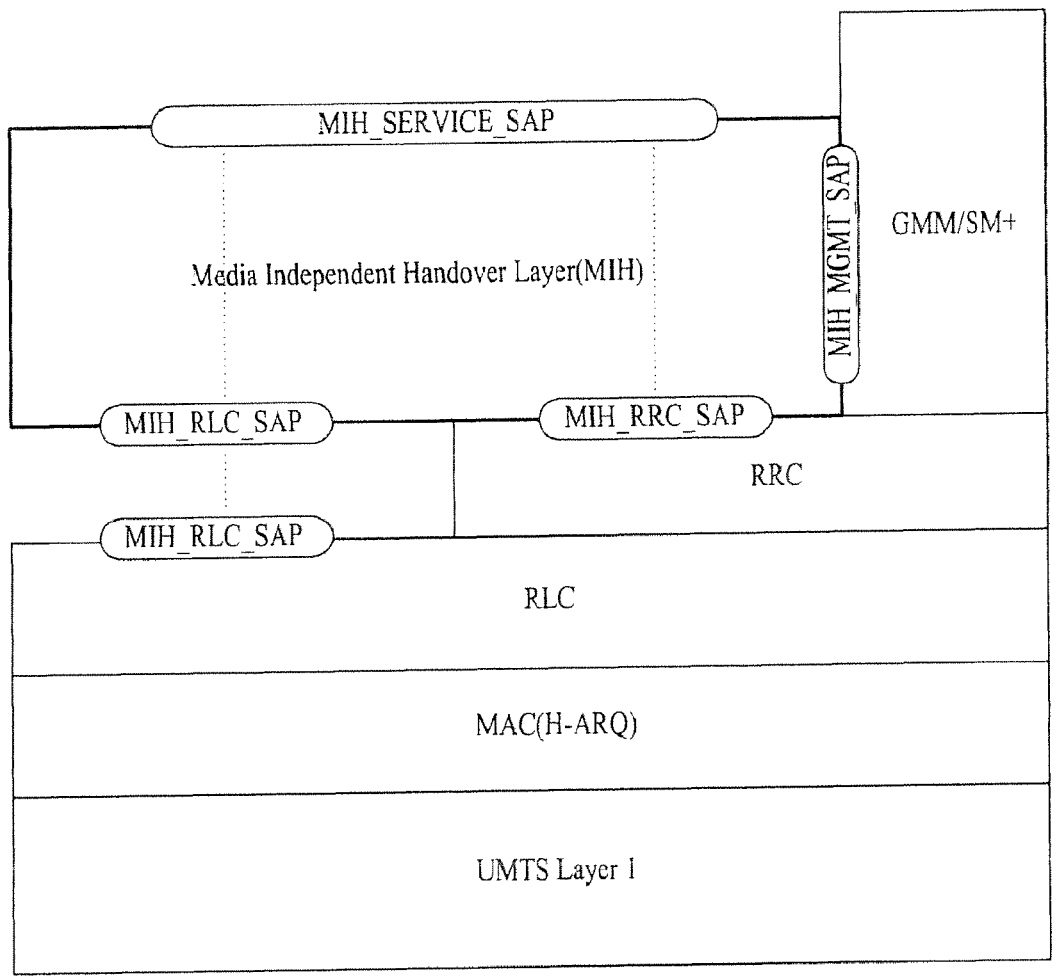
FIG. 8 illustrates an architecture of a 3GPP system in a protocol stack considering the MIH.
Figure 9:
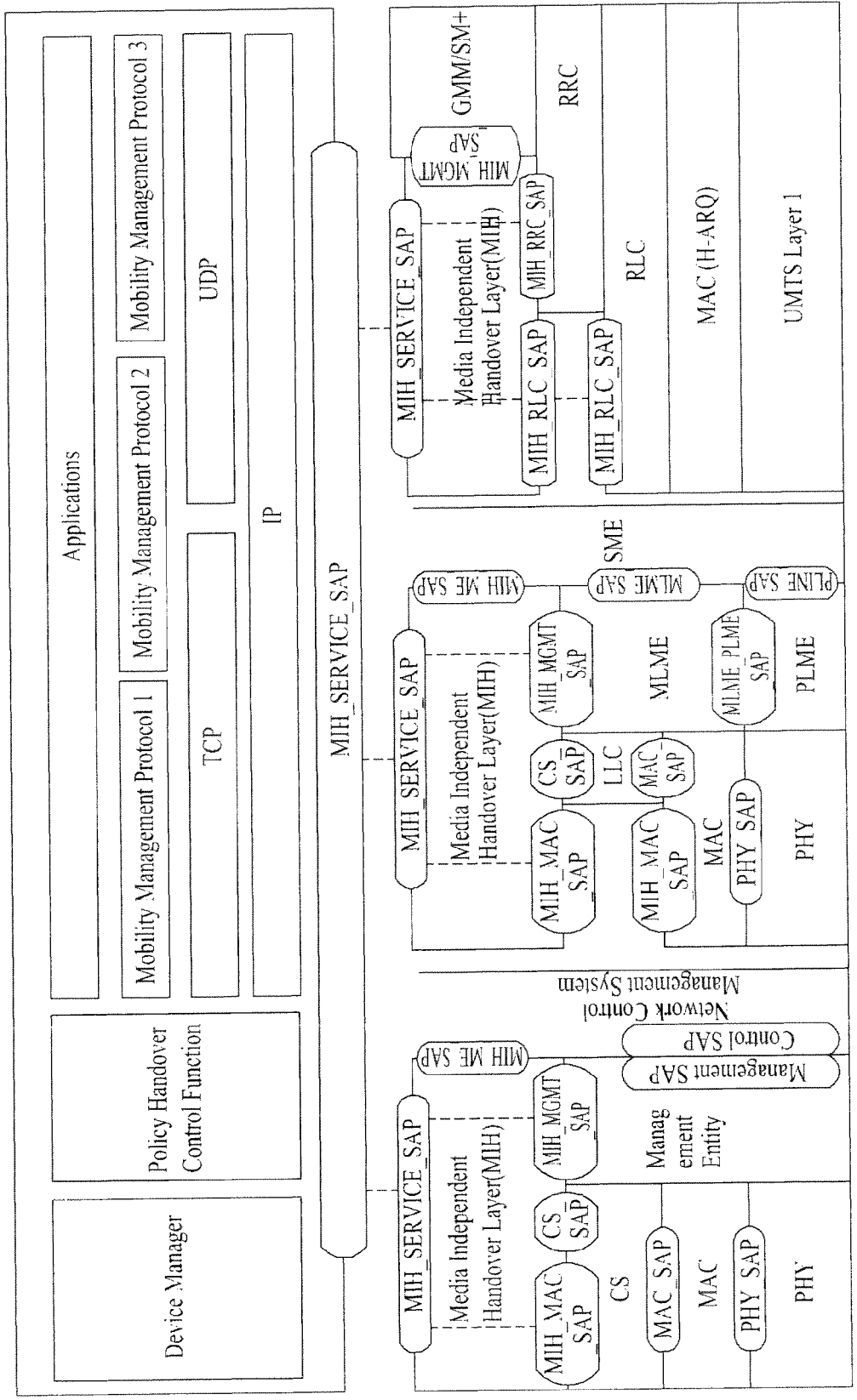
FIG. 9 illustrates an architecture for implementing a protocol stack in a multi-mode mobile terminal which does not include a MIH CS in accordance with an embodiment of the present invention.
Figure 10:
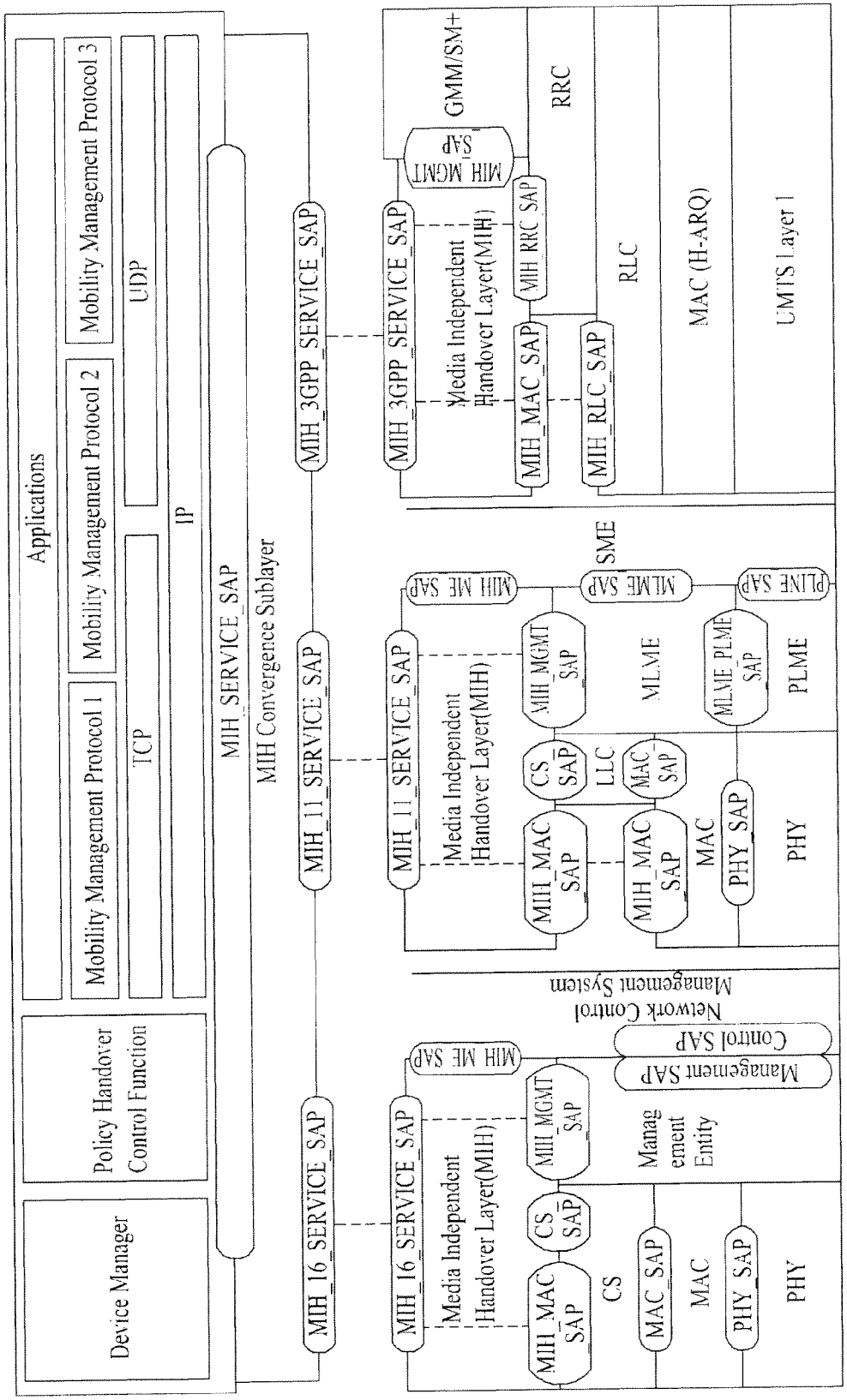
FIG. 10 illustrates an architecture for implementing a protocol stack in a multi-mode mobile terminal which includes an MIH CS in accordance with one embodiment of the present invention.
Figure 11:
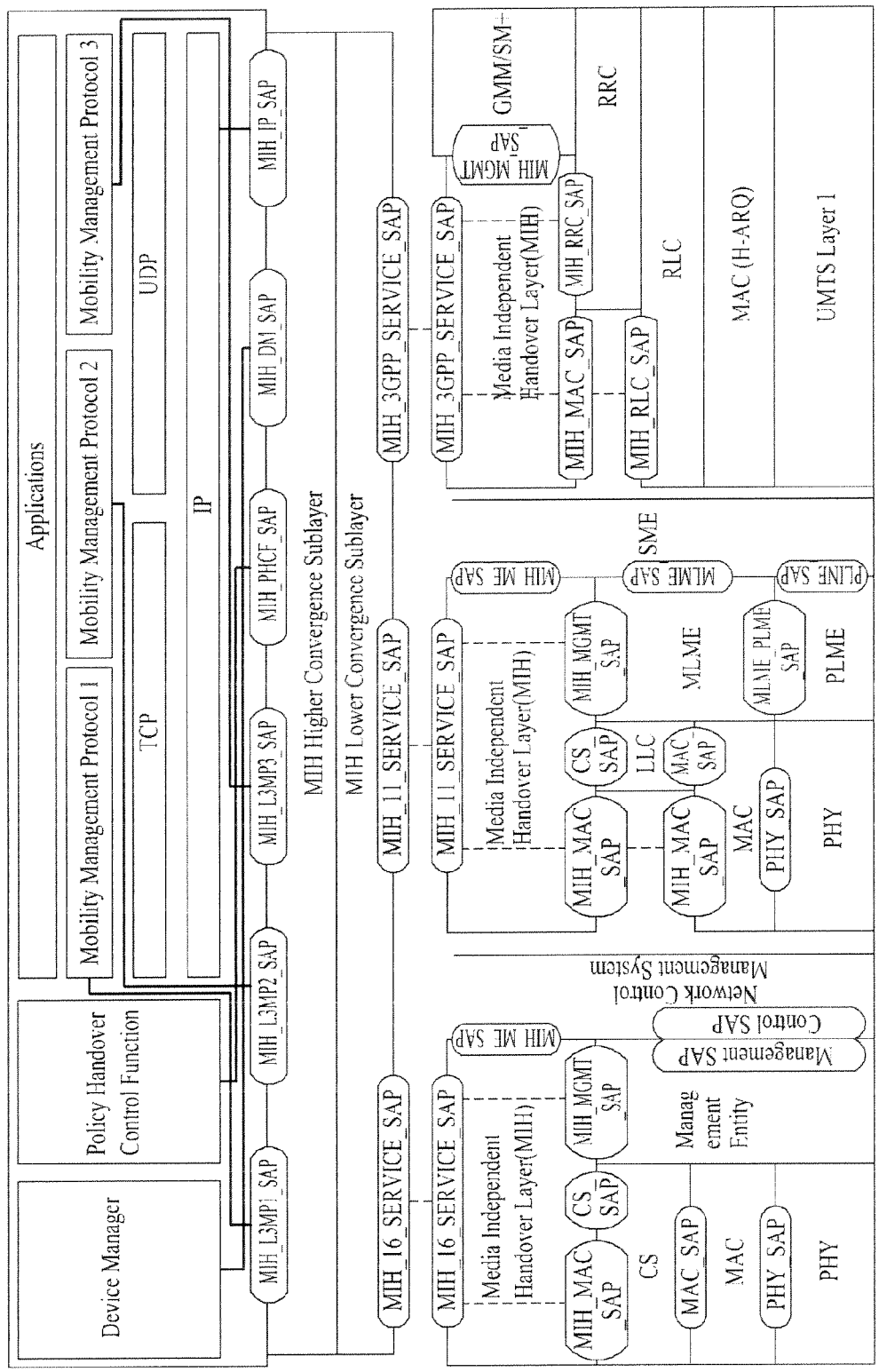
FIG. 11 illustrates an architecture for implementing a protocol stack in a multi-mode mobile terminal which includes an upper MIH CS and a lower MIH CS in accordance with one embodiment of the present invention.
Figure 12:
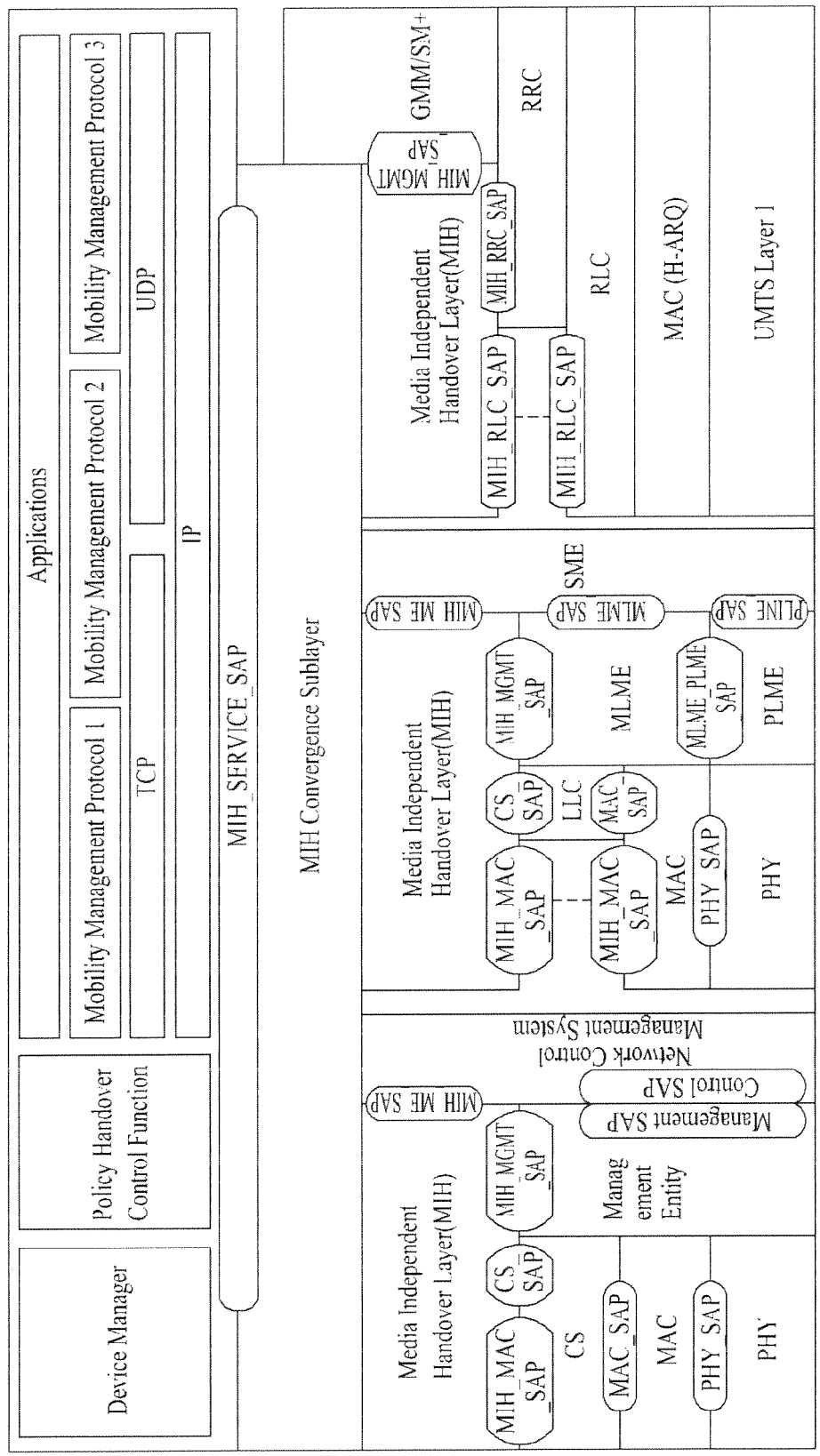
FIG. 12 illustrates an architecture for implementing a protocol stack in a multi-mode mobile terminal, wherein an MIH CS exists as a function in accordance with one embodiment of the present invention.

A protocol stack of the multi-mode mobile terminal can be classified into a MIH layer having a MIH Convergence Sublayer (CS) or not having the MIH CS. With that, FIG. 9 illustrates an example of a MIH layer without the MIH CS, whereas FIGS. 10-12 illustrate examples of a MIH layer with the MIH CS. A device manager and a policy handover control function of FIGS. 9-12 represent conceptual entities and as such, the functions of the two entities can be combined as one in a management entity. Here, an entity can also be referred to as a module.

In the examples of the present invention to follow, the functions of the device manager and the policy handover control function can be carried out by the management entity, and reference to the management entity signifies the management entity having the functions of the two aforementioned entities. In addition, if a mobility management protocol entity is able to perform the policy handover control function, the mobility management protocol entity can carry out the management functions.

FIG. 9 illustrates an architecture for implementing a protocol stack in a multi-mode mobile terminal which does not include a MIH CS in accordance with an embodiment of the present invention. In FIG. 9, because lower MIHs communicate with upper protocols, respectively, communications from the MIHs are preferably performed via the corresponding upper protocol or management entity.

FIG. 10 illustrates an architecture for implementing a protocol stack in a multi-mode mobile terminal which includes an MIH CS in accordance with one embodiment of the present invention. In FIG. 10, the MIH CS can manage lower MIHs. The signals delivered from the lower MIHs can be collected by the MIH CS. The MIH CS can then transfer the collected signal to higher layers. Although it is possible for the MIH CS to deliver the lower layer signals to the higher layers transparently, it is preferable that the MIH CS unify the signals from the lower MIHs by varying the lower layer signals and then deliver the unified signals to the higher layers.

FIG. 11 illustrates an architecture for implementing a protocol stack in a multi-mode mobile terminal which includes an upper MIH CS and a lower MIH CS in accordance with one embodiment of the present invention. In FIG. 11, an MIH is divided into an MIH Higher CS and an MIH Lower CS. Preferably, the MIH Lower CS functions similar to the MIH CS described in FIG. 10. Similarly, the MIH Higher CS takes charge of communications to and from higher protocols. If necessary, the MIH Higher CS can establish an individual SAP with each higher entity to individually communicate with the respective higher entity.

FIG. 12 illustrates an architecture for implementing a protocol stack in a multi-mode mobile terminal, wherein an MIH CS exists as a function in accordance with one embodiment of the present invention. In FIG. 12, an SAP between the MIH CS and the MIH need not exist.

Provided below are messages defined or amended in accordance with the embodiments of the present invention.

A MGMT_PowerOn.request message can be transmitted from the upper management entity to the MIH. This message includes a request to the upper management entity to power on a specified link and to perform link detection and scanning operations. If the MIH CS exists, a list of the links to be detected and scanned is sent to the MIH CS.

A MIH_PowerOn.request message can be transmitted from the MIH CS to a specified link of the MIH. This message includes a request to commence detection and scanning operations on specified links requested by the management entity.

A MLME-POWERMGT.request message can be used to manage power status in a mobile terminal, which accesses a wireless LAN system, and can be transmitted from a Station Management Entity (SME) to a MAC Layer Management Entity (MLME). If a "Power On" parameter is included in the message transmitted by the MIH of the wireless LAN (e.g., IEEE 802.11), the management entity of the MAC layer and the physical (PHY) layer powers on the corresponding link and performs link detection and scanning operations. Alternatively, if a "Power Down" parameter is included in the message transmitted by the MIH of the wireless LAN, the management entity of the MAC layer and the PHY layer powers down/off and enters power saving mode.

A CPHY-RL-PowerOn-REQ message can be used to manage power status of the mobile terminal accessing a cellular system. If a "Power On" parameter is included in the message transmitted by the MIH of the cellular system (e.g., 3GPP), the management entity of the MAC layer and the physical (PHY) layer powers on or activates the corresponding link and performs link detection and scanning operations.

A CPHY-RL-PowerDown-REQ message can be used to manage power status of the mobile terminal accessing a cellular system. If a "Power Down" parameter is included in the message transmitted by the MIH of the cellular system (e.g., 3GPP), the management entity of the MAC layer and the physical (PHY) layer powers off (deactivates) and enters power saving mode.

A CPHY-Measurement-IND message can be used to notify the upper entities of measured link quality results by the mobile terminal accessing a cellular system. In the embodiments of the present invention, the MIH layer or the MIH entity of the upper entities can be included.

A M_Scanning.confirmation message can be used to notify the upper entities of measured link quality results in a wireless broadband system.

A MLME-SCAN.confirmation message can be used to notify the upper entities of measured link quality results by the mobile terminal accessing a wireless LAN system.

A MIH_SCAN.confirmation message can be used by the MIH of each link to notify measured link quality results of the received links to the MIH CS.

A MGMT_SetupLink.request message can be used by the upper management entity to transmit information to the MIH for establishing connection with at least one available link or with all available links. When a list of at least two available links is transmitted, the MIH considers the priority based on some policy in establishing a link.

A MIH_SetupLink.indication message can be used by the upper management entity to transmit information for establishing link with at least one link received in the MGMT_SetupLink.request message to a specific link of the MIH.

A MIH_LinkOn.indication message can be used to notify that the MIH of each link has completed link establishment with the MIH CS when a message indicating link establishment with each link is transmitted to the MIH. This information included in the message if a mobility management protocol that can be used in the link establishment procedure is determined.

A MGMT_PowerDown.request message can include a request by the upper management entity to power down for controlling power of a multi-mode mobile terminal. This message can be transmitted to the MIH of the corresponding link when the upper management entity decides to power down/off link(s) other than the specified link or to power down the link for a different reason. If the upper management entity has decided to power down more than two links, then the corresponding links can be included in a single message.

A MIH_PowerDown.request message can include request by a MIH CS to power down/off by the MIH of the corresponding link, which has been selected by the upper management entity to power down/off. This message can be transmitted to all corresponding links selected by the upper management entity to have the links power down/off.

A MIH_LinkOn.indication message can be transmitted to the MIH CS when the MIH of each corresponding link is notified by a Medium Access Control (MAC) layer that link establishment has completed.

A Link Available message can be used by the MIH CS, after receiving a link quality measurement result of the received links, to notify the upper management entity of the available links. A list of the available links can be transmitted in a single message.

A Link On message can be used by the MIH CS, after receiving that link establishment is completed from the MIH of the corresponding links, to notify the upper layers including the upper management entity and the mobility management entity that link is established with the corresponding links. If connections are established with multiple links, a list of the multiple links having established connection can be included in the message.

A MGMT_PowerOn.confirmation message can be transmitted by the MIH to the upper management entity which manages the multi-mode mobile terminal. This message can be used by the upper management entity to transmit information on whether the request to power on the corresponding link in order to perform link detection and scanning operations has been successfully performed or not. If the operation is unsuccessful, the reason for the failed attempt can be included in this message.

A MIH_PowerOn.confirmation message can be transmitted by the MIH of a specific link to the MIH CS. This message can be used by the MIH to notify the MIH CS whether the request to power on the corresponding link in order to perform link detection and scanning operations has been successfully performed or not. If the operation is unsuccessful, the reason for the failed attempt can be included in this message.

A MGMT_PowerDown.confirmation message can be transmitted by the MIH to the upper management entity which manages the multi-mode mobile terminal. This message can be used by the upper management entity to transmit the result of whether the corresponding link has been powered off/down or not, and if the power down was unsuccessful, then the reason for failed power off attempt can be include the message. If there are two or more links to power down and the result of the MIHs of more than two of different power down/off types is received, then all these information can be included in the message and transmitted to the upper management entity.

A MIH_PowerDown.confirmation message can be transmitted by the MIH to the MIH CS. This message includes information on whether the corresponding link has been successfully powered down or powered off. If the operation is unsuccessful, the reason for the failed attempt can be included in this message.

In the messages above, powering on can be referred to activating the link to allow link setup/establishment. On the contrary, powering down/off can be referred to as deactivating the link to allow the link to sever the connection.

Figure 13:
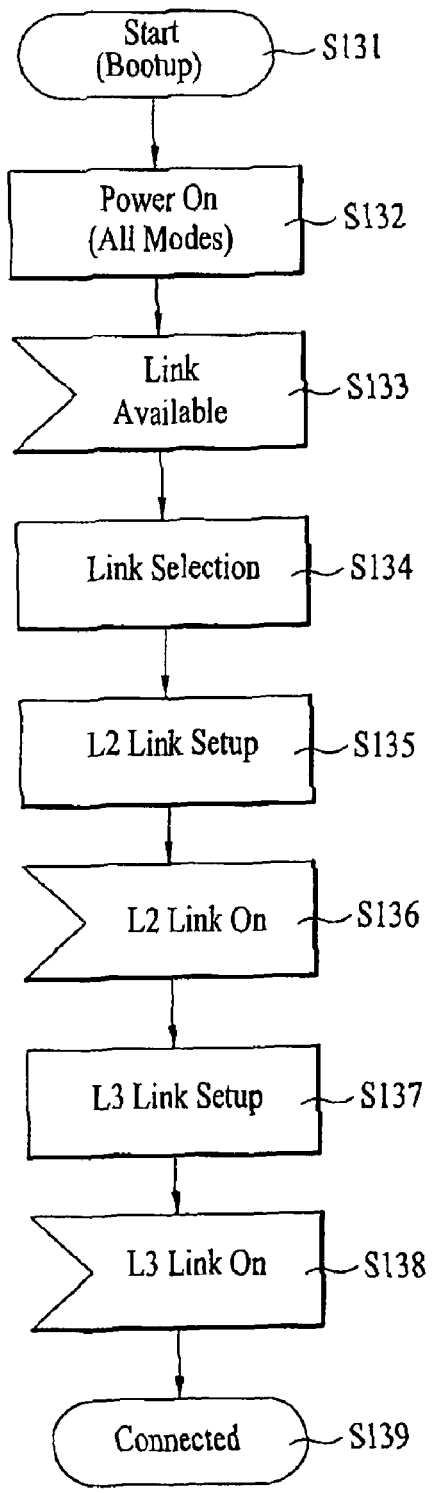
FIG. 13 is a flowchart of a procedure for establishing initial connection according to another embodiment of the present invention.

FIG. 13 is a flowchart of a procedure for initializing according to another embodiment of the present invention. In FIG. 13, the operation of the multi-mode mobile terminal commences in order to initialize (S131). The commencement of the mobile terminal includes initial booting up of all the interfaces and detection of available links. Initial booting up indicates powering on the corresponding interface and once this powering on stage is completed, then the mobile terminal can detect and is ready to access available wired and/or wireless links (S132).

Once power to all modes is verified and ready for link detection, the mobile terminal then detects for available links (S133). When an available link is detected, the mobile terminal selects a link to establish connection with (S134). Since the mobile terminal is multi-modal, more than two available links can be detected such as wireless LAN link, broadband wireless access link, wired LAN link, 3GPP cellular wireless network link and a like. If the link is selected based on policy, a pre-selected policy with a service provider or a policy received dynamically by the network can be applied. Moreover, there can be multiple link establishments.

With respect to the link establishment, Layer 2 links or below the MAC layer links can be established (S135). Here, Layer 2 includes wireless or wired physical link. In establishing below Layer 2 links, if multiple links establishments are available, one link can be selected and/or all available or multiple links can be selected. By establishing either a single link or multiple links, link set up can be completed (S136). By performing a Layer 3 link establishment procedure for communicating Internet Protocol (IP) packets (S137), Layer 3 link can be established (S138). When the Layer 3 link establishment is completed, the multi-mode mobile terminal can transmit/receive IP packets via the selected or established link (S139).

Hereafter, a procedure for establishing initial connection and link establishment of a multi-mode mobile terminal that supports a plurality of wired or wireless interface according to preferable embodiments of the present invention will be described. Preferably, the multi-mode mobile terminals as described in the embodiments include a mobile terminal, represented by an interface between at least two networks, from cellular networks such as wireless network, broadband wireless network, and 3GPP. Moreover, the multi-mode mobile terminals include different wired LAN and different wireless LAN, preferably. Furthermore, although the wireless LAN according to the embodiment of the present invention describes an embodiment of a network using IEEE 802.11 standard, an embodiment of a network using IEEE 802.16 standard, and an embodiment of a network using 3GPP standard, if the MIH layer is applied to the multi-mode mobile terminal, the wireless can be applied to different standards as well.

Figure 14:
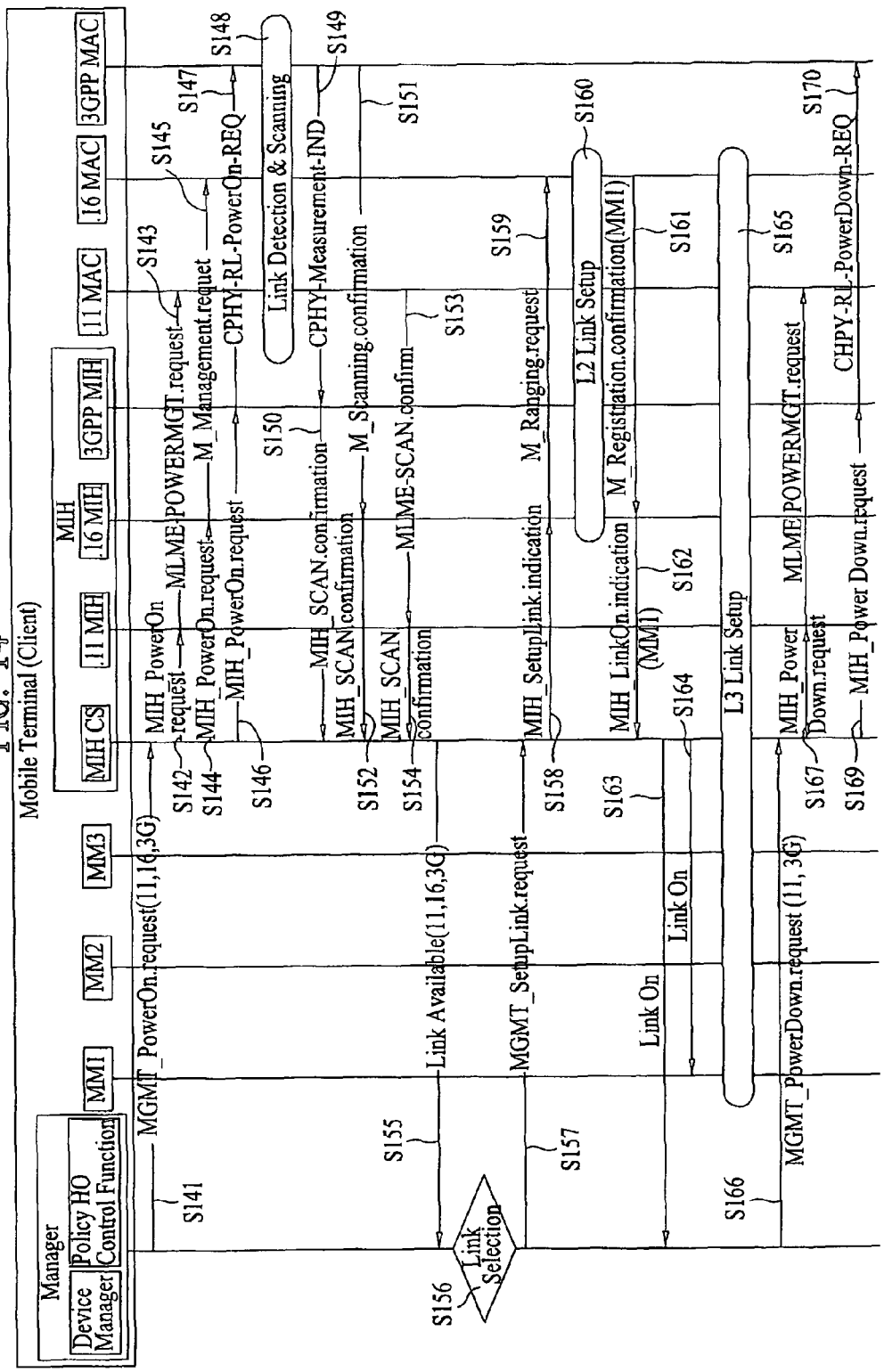
FIG. 14 is a flowchart of a procedure according to an embodiment of the present invention.

FIG. 14 is a flowchart of a procedure according to an embodiment of the present invention. In FIG. 14, the upper management entity powers on to setup the corresponding link (i.e., interface) of the multi-mode mobile terminal when power to the multi-mode mobile terminal is granted, detects for available links, and sends a command (i.e., MGMT_PowerUp.request) message to the MIH CS (S141). Here, the upper management entity determines an interface to connect with according to any information or policy and thereafter, can connect that particular interface. Moreover, the upper management entity can include a list of interfaces with which connection can be established in the MGMT_PowerUp.request message.

The MIH CS learns of the link (i.e., interface) to establish connection with through the received MGMT_PowerUp.request message. According to the embodiment of FIG. 14, the MIH CS communicates directly via the MAC layer and the PHY layer of the wireless LAN interface of IEEE 802.11 or indirectly via the management entity, and transmits a message commanding the MIH of the wireless LAN interface to power on and detect links and perform scanning to measure signal qualities (S142). The above embodiment is not limited to IEEE 802.11 but can also be applied to IEEE 802.16, 3GPP, and/or other wired or wireless network interfaces.

As described above, the MIH of the wireless LAN interface, which operates while communicating directly with MAC layer and the PHY layer of the wireless interfaces or indirectly through the management entity, uses the primitives used to communicate with the management entity of the wireless LAN to command detection of wireless LAN links and scanning of the links to measure signal qualities (S143).

Similar to S142, the MIH CS communicates directly with MAC layer and the PHY layer of a broadband wireless access network interface of IEEE 802.16 or indirectly with the management entity of the broadband wireless access network interface of IEEE 802.16. Furthermore, the MIH CS commands the broadband wireless access network interface to power on and perform link detection and scanning procedure for measuring signal qualities (S144).

In addition, the MIH of the broadband wireless access system, which operates while communicating directly with MAC layer and the PHY layer of the wireless interfaces or indirectly through the management entity, uses the primitives used to communicate with the management entity of the broadband wireless access system to command detection of broadband wireless access system links and scanning of the links to measure signal qualities (S145).

Further, the MIH CS of the 3GPP cellular network interface, which operates while communicating directly with MAC layer and the PHY layer of the cellular network interfaces or indirectly through the management entity, commands the MIH of the cellular network to power on and perform link detection and scanning procedure to measure signal qualities (S146).

Furthermore, the MIH of the 3GPP cellular network interface, which operates while communicating directly with MAC layer and the PHY layer of the cellular network interfaces or indirectly with the management entity, uses the primitives used to communicate with the management entity of the cellular network interface to command performance of link detection of the cellular system and of scanning procedure to measure signal qualities (S147).

Steps S142, S144, and S146 can be performed simultaneously. These steps are different examples of link detection and signal quality measurement performed by each of different interfaces (S148).

The MAC layer of the cellular system can use the primitives used to communicate with the management entity of the cellular network to send the results of the link detection and scanning to the MIH of the cellular system (S149). If the quality of the link is difficult to measure, the MAC layer of the cellular system can include only the link detection result in the primitive. Although the present embodiment is described with respect to the 3GPP cellular network interface, the same procedure, as described above with respect to the 3GPP cellular network interface, can be applied to IEEE 802.11 wired LAN network and IEEE the broadband wireless access network interface of IEEE 802.16. That is, the link detection and scanning results can be delivered to the MIH of the each system as done in the 3GPP cellular network interface. The MIH of the cellular system can transmit the results of the link detection and scanning to the MIH CS (S150).

The MAC layer of the broadband wireless network can use the primitives used to communicate with the management entity of the broadband wireless network to send the results of the link detection and scanning to the MIH of the broadband wireless network interface (S151). If the quality of the link is difficult to measure, the MAC layer of the broadband wireless network can include only the link detection result in the primitive. The MIH of the broadband wireless network can transmit the results of the link detection and scanning to the MIH CS (S152).

The MAC layer of the wireless LAN network of IEEE 802.11 can use the primitives used to communicate with the management entity of the wireless LAN network to send the results of the link detection and scanning to the MIH of the wireless LAN network interface (S153). If the quality of the link is difficult to measure, the MAC layer of the wireless LAN network can include only the link detection result in the primitive. The MIH of the wireless LAN network can transmit the results of the link detection and scanning to the MIH CS (S154).

Thereafter, the MIH CS can notify to the management entities the available links based on the collected results (S155). If there is more than one available link, the available link(s) can be organized and transmitted in a form of a list. Here, the upper management entity comprises the device manager, the policy handover control function, the mobility management entity and a like. As illustrated in FIG. 14, if the upper management entity is classified into a manager which includes the mobility management entities (e.g., MM1, MM2, MM3), the device manager, and the policy handover control function, a separate message can be sent to the mobility management entity.

The upper management entity can select a link based on the information (e.g., list of available links) received from the MIH CS (S156). The link selection can be based on policy and more than one link can be selected. If multiple links are selected, the selected links can be assigned priority so that multiple link establishment can be commanded at a later time.

Thereafter, the upper management entity transmits the MGMT_SetupLink.request message to the MIH CS to command link establishment with the selected link (S157). Here, if more than one link has been selected during the link selection process, then the MGMT_SetupLink.request message can include a list of the selected links. This embodiment relates to a broadband wireless access network links selected based on some policy or situation.

After receiving the command message to establish link or setup link, the MIH CS determines the types of links received via the message from the upper management entity, and then requests link establishment with the corresponding link (S158). In this example, the upper management entity has selected the link from the broadband wireless access network and accordingly, the MIH CS requests for link establishment to the MIH entity of the broadband wireless access network.

The MIH, which operates while communicating directly with MAC layer and the PHY layer of the corresponding link or indirectly through the management entity, uses the primitives used to communicate with the upper management entity to command link establishment (S159). In this embodiment, the command to establish/setup broadband wireless access network link is included in the primitive that can be used in the broadband wireless access network.

After receiving the command message, the MAC layer and the PHY layer of the corresponding link establishes the link (S160). The management entity of the corresponding link can use the primitive used by the MIH of the corresponding link and management entity to deliver the results of the link establishment (link setup) to the MIN of the corresponding link (S161). The embodiment of the present invention relates to the management entity of the broadband wireless access system notifying the results of the link establishment to the MIH of the corresponding link. If the mobility management protocol is negotiated or notified during the link setup procedure, the negotiated and/or notified information can be included in the message sent to the MIH of the corresponding link. The MIH of the corresponding link delivers the results of the link setup to the MIH CS (S162). The results of the link setup can be sent even after available mobility management protocol is received.

In order to notify that the upper layer can transmit packet(s) after the link is established, the MIH CS can send a 'Link Up' message to the upper management entity (S163). In the message sent to the upper management entity, the available mobility management protocol type(s) can be included. Furthermore, the MIH CS can send the 'Link Up' message to the mobility management entity (i.e., MM1) directly to notify that the link has been set up (S164). Preferably, as an alternate method, the upper management entity can send the 'Link Up' message to the mobility management entity to notify that the link has been set up.

The mobility management entity can perform Layer 3 link set up (S165). The upper management entity can power off (deactivate) unused links in order to conserve power consumption. In the embodiment according to FIG. 14, the upper management entity can send a command to the MIH CS to power off the links connecting the wireless network and the cellular network (S166). If there is more than one link whose power should be powered down/off, then the message can include a list of these links.

The MIH CS can acquire information of the links whose power should be powered off from the received message and transmits a request message to the MIH of the corresponding link(s) to power off (S167, S168). After receiving the power down/off message from the MIH CS, the MIH of the corresponding link(s) can use the primitives to command power down to the MAC layer and the PHY layer of the corresponding link(s) (S169, S170).

Figure 15:
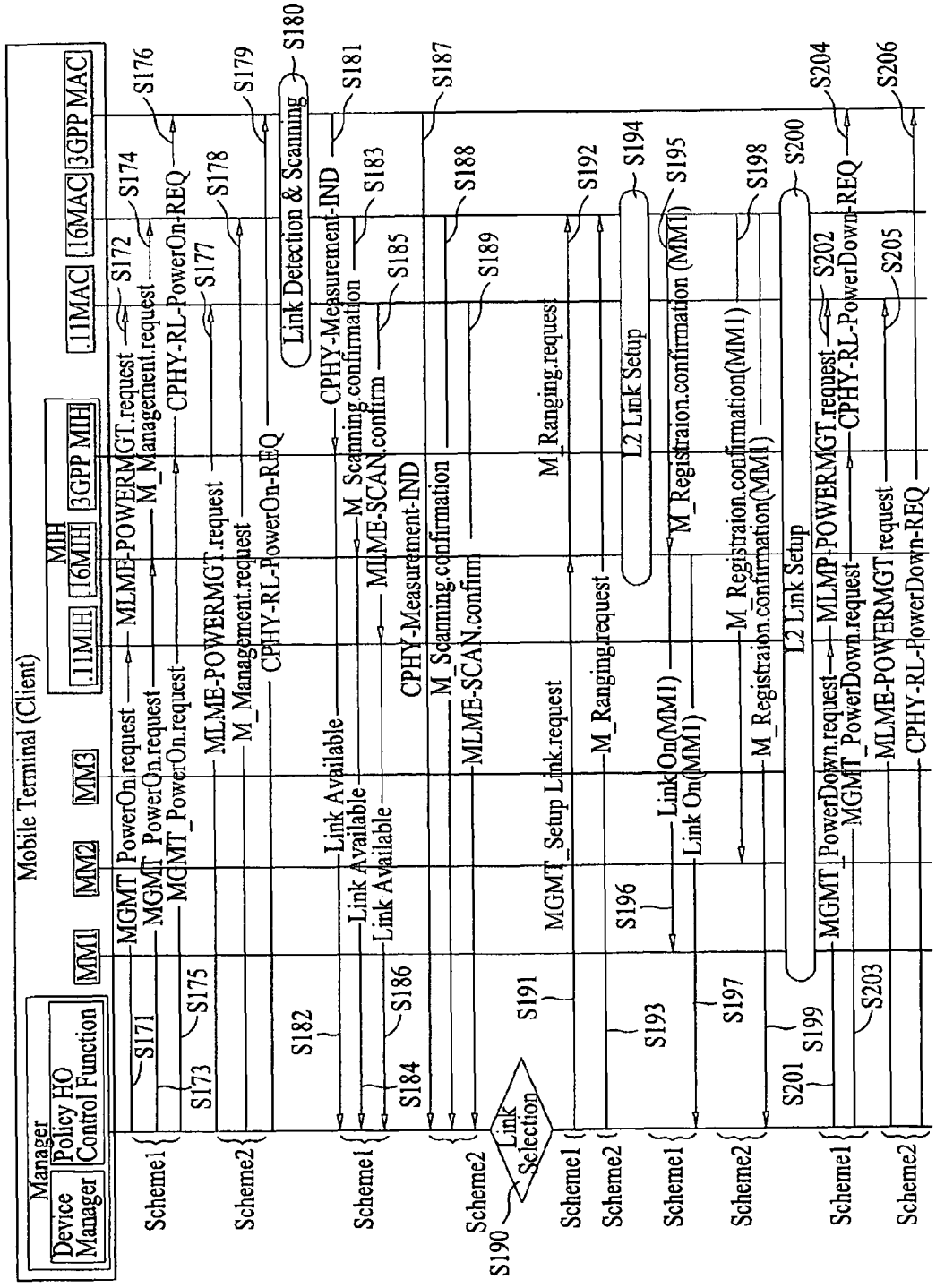
FIG. 15 is a flowchart of a procedure according to another embodiment of the present invention.

FIG. 15 is a flowchart of a procedure according to another embodiment of the present invention. In FIG. 15, the object is same as that of FIG. 14 or illustrates a situation where MIH CS is not available. The embodiment of FIG. 15 is divided into two schemes, namely, Scheme 1 and Scheme 2. In detail, Scheme 1 relates to handover between heterogeneous networks according to the communication between the upper management entity and the MIH. In addition, Scheme 2 relates to handover between the heterogeneous networks according to direct communication by the upper management entity to the corresponding link. Here, Scheme 1 and Scheme 2 seek to accomplish the same objective, and the procedures/operations of these two schemes can be combined and used interchangeably.

In Scheme 1, the upper management entity of the multi-mode mobile terminal can command the MIH, which communicates with a specific link, to power on to perform initial link set up (S171, S173, S175). In this embodiment, the messages can be sent to the MIH layer which communicates with the protocols of each IEEE 802.11 wireless LAN network, IEEE 802.16 broadband wireless access network, and 3GPP cellular network. The MIH of the corresponding link can use the primitives used to communicate with the management entity of the corresponding links to send a command to the MAC layers of the corresponding links to power on to initialize link set up (S172, S174, S176). The primitives of the steps S172, S174, and S176 can include the parameter for powering on and initializing link set up or establishment.

In Scheme 2, the upper management entity sends directly, without going through the MIH of the corresponding links, a message to the MAC layer of the corresponding links where the message includes the primitive, which includes a parameter representing a command to power on and initialize link set up, used by the management entity of the corresponding links (S177, S178, S179).

After receiving a command to power on and initialize link set up, the MAC layer of the corresponding links can perform link set up (establishment) with the PHY layer and scanning to measure link qualities (S180). This procedure is same in Scheme 1 and Scheme 2.

In Scheme 1, the MAC layer of the each interface delivers the primitives which includes the results of the link detection and link quality measurement (i.e., scanning) to the MIH layer of each corresponding link (S181, S183, S185). Here, if the link was not detected in the MAC layer of the interface, this primitive would not be sent. Thereafter, the MIH of each corresponding link delivers the received results of the link detection and link quality measurement to the upper management entity (S182, S184, S186). That is, the upper management entity is notified of the available links that communicate with the MIH. If the link is available, the quality of the link can be included in the message to the upper management entity. Although the embodiment of the present invention provides information related to available links in the upper management entity, it is possible to provide this information to the mobility management entity.

In Scheme 2, the MAC layer of the corresponding interfaces having detected the links delivers directly the primitives which includes the results of the link detection and link quality measurement (i.e., scanning) to the upper management entity (S187, S188, S189).

After receiving the results, the upper management entity can select a link(s) based on the results of the available link(s) (S190). Here, a multiple links can be selected according to the policy. According to the embodiment of FIG. 15, the upper management entity selects the link; however, the mobility management entity can make the link selection as well. This selection procedure can be uniformly applied to Scheme 1 and Scheme 2.

In Scheme 1, the upper management entity can request to the MIH of the corresponding link for a link set up with the selected link (S191). Subsequently, the MIH of the corresponding link delivers the link selection information to the MAC layer using the primitive that can be used in the corresponding interface (S192). The embodiment as shown in FIG. 15 illustrates a link setup procedure in the broadband wireless access network interface.

In Scheme 2, the upper management entity can use the primitive used by the corresponding interface to send a message to command link establishment with the MAC layer of the corresponding link (S193). In this embodiment, the upper management entity sends the request; however, it is possible for the mobility management entity to send the request as well.

After receiving the command to establish link, the MAC layer of the corresponding link can establish or set up link (S194). Here, it is possible for the MIH to establish link during the link set up procedure. The step S194 can be applied in Scheme 1 and Scheme 2.

In Scheme 1, the MAC layer of the corresponding link can notify the MIH of the corresponding link that the link set up is complete (S195). If the mobility management protocol to be used is determined during the link set up procedure, then this mobility management protocol information can be included in the notification tot the MIH of the corresponding link. Thereafter, the MIH can notify the mobility management entity that the corresponding link has established link (S196). Here, the mobility management entity receiving the link establishment information is the mobility management entity determined during the link set up (or establishment) procedure. In addition, the MIH can deliver link set up complete message to the upper management entity (S197). Here, the message can include the information of the mobility management entity to be used.

In Scheme 2, the MAC layer of the corresponding link can directly notify to the upper management entity and the mobility management entity that link set up is completed by using the primitive used by the corresponding link (S198, S199)

After being notified that link is established with the entities below Layer 2, the mobility management entity can set up links in Layer 3 (S200). This procedure can be applied in Scheme 1 and Scheme 2.

In Scheme 1, the upper management entity can send a message requesting power off (deactivation) of the links (e.g., wired LAN network of IEEE 802.11, cellular network of 3GPP), other than the selected link, to the MIH of the corresponding link (S201, S203). In operation, the MIH of the corresponding link can use the primitive to send a power off request to the MAC layer via the upper management of the corresponding link (S202, S204).

In Scheme 2, the upper management entity can directly send a message to the MAC layer of the corresponding link to request for link power down/off on the links other than the selected link (S205, S206).

Figure 16:
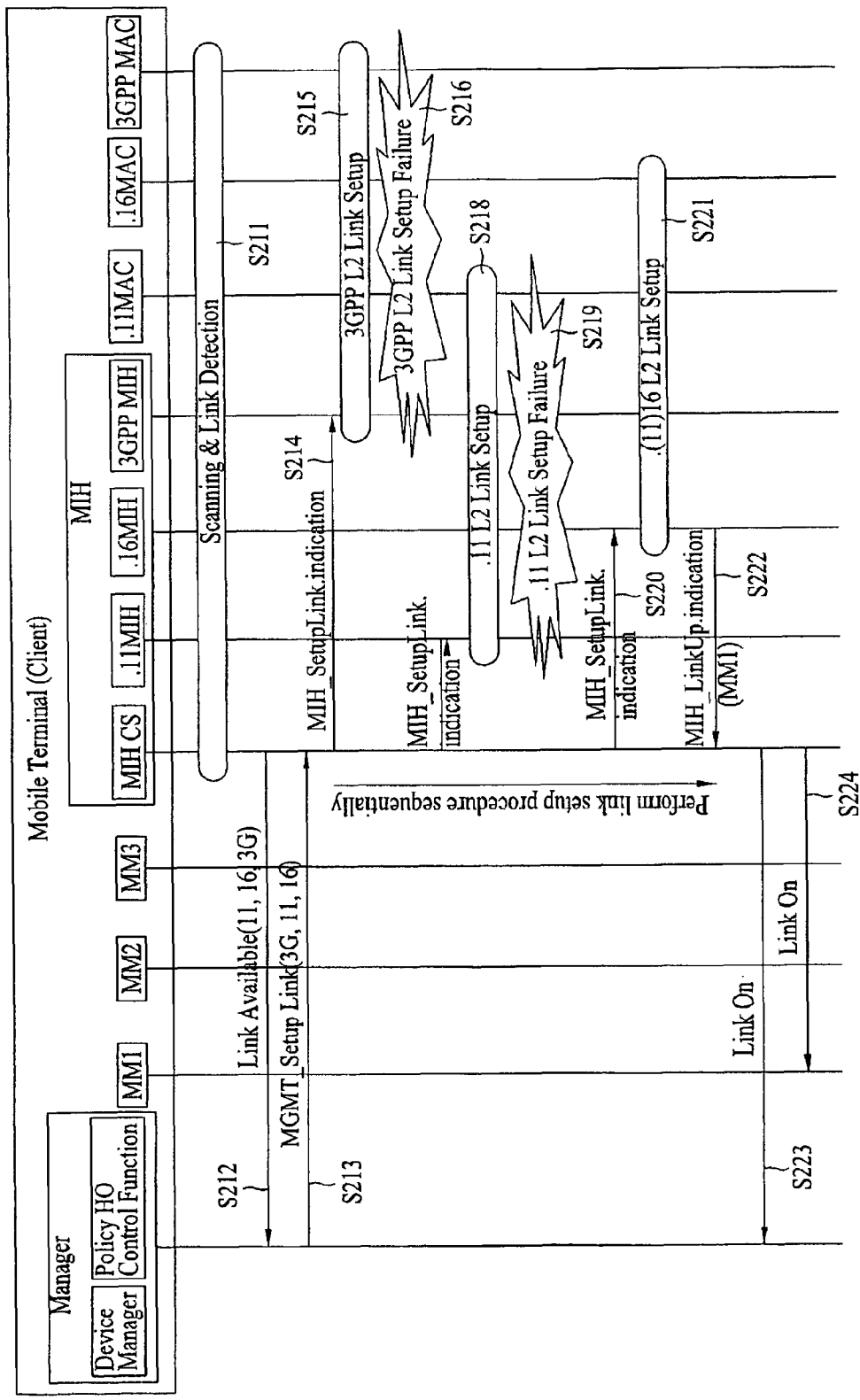
FIG. 16 is a flowchart of a procedure according to another embodiment of the present invention.

FIG. 16 is a flowchart of a procedure according to another embodiment of the present invention. More specifically, FIG. 16 illustrates a procedure for setting up multiple links. That is, a multiple link set ups can be performed on the links of multiple interfaces detected by the upper management entity or the mobility management entity.

Each interface of the multi-mode mobile terminal can perform link detection procedure (S211). The result of the link detection can be transmitted to the MIH CS via the MIH of each link. Thereafter, the MIH CS can notify the received results of the link detection to the upper management entity (S212). Here, if more than two links are detected, a list of the detected links can be sent to the upper management entity for link selection.

When the upper management entity determines to set up multiple links, a link setup request message, including a list of at least two links, can be sent to the MIH CS requesting for multiple link set up (S213). Here, the priority of the list of the links can be based on a policy determined by the manager or some other policy. In the embodiment of FIG. 16, the 3GPP cellular network has the highest priority, followed by the wireless LAN network of IEEE 802.11 and the broadband wireless access network of IEEE 802.16. This order of priority is merely an example and can be arranged in different order.

After receiving the link setup request message, the MIH CS can send a message commanding the MIH of the corresponding link (interface) to carry out the link set up in the order provided in the message (S214). That is, the command message instructs the link set up with the cellular link having the highest priority first. Thereafter, the MIH of the cellular interface and the entities below the MAC layer (also referred to as MAC sublayer), including the MAC layer, can perform the link set up procedure (S215). If the link set up procedure fails (S216), a message need not be sent or a message indicating link set up failure can be sent to the MIH so that the failure message can be relayed to the MIH CS.

The MIH CS can determine whether the link set up is successful or not based on a timer or the failure message relayed from the MIH. After determining the failed outcome of the link set up procedure, the MIH CS can proceed to set up link with the link having the next highest priority. In the present embodiment, the link set up is commanded with a link having the next highest priority, which is the wireless LAN link, based on a timer after a specified time elapses (S217). The MIH of the wireless LAN interface and the entities below the MAC layer, including the MAC layer, can perform the link set up procedure (S218). If the link set up with the wireless LAN network fails (S219), the MIH CS can determine failed link set up based on the timer or the link set up failure message relayed from the MIH. After determining the failed outcome of the link set up procedure, the MIH CS can proceed to set up link with the link having the next highest priority. In FIG. 16, the MIH CS requests a link set up with the link having the next highest priority, that being the broadband wireless access network (S220).

Subsequently, the MIH of the broadband wireless access network and the entities below the MAC layer, including the MAC layer, can carry out the link set up procedure (S221). If the link set up is successful, a message indicating a successful link establishment can be sent to the MIH CS (S222). Then, the MIH CS relays the message of the successful link set up to the upper management entity (S223). Here, the information of the established link can be included in the message. Furthermore, the MIH CS can notify the message of the successful link establishment to the mobility management entity (S224). Here, the information of the established link can be included in the message.

Figure 17:
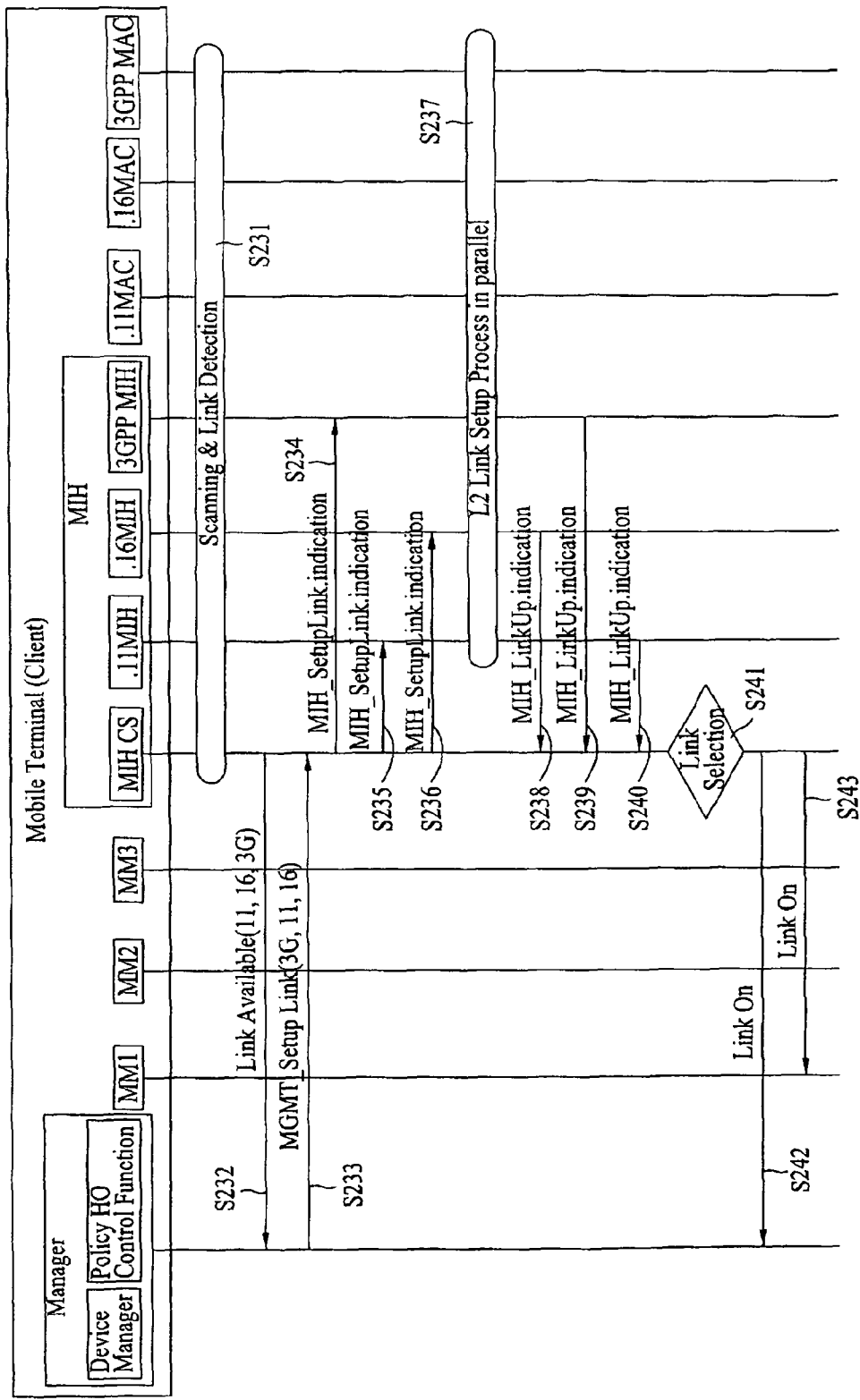
FIG. 17 is a flowchart of a procedure according to yet another embodiment of the present invention.

FIG. 17 is a flowchart of a procedure according to yet another embodiment of the present invention. More specifically, FIG. 17 illustrates a procedure in which the MaI CS performs link set up procedure sequentially. That is, when multiple links are successfully set up, the MIH CS can select the link based on the priority received from the upper management entity.

Each interface of the multi-mode mobile terminal can perform link detection procedure (S231). The result of the link detection can be transmitted to the MIH CS via the MIH of each link. Thereafter, the MIH CS can notify the received results of the link detection to the upper management entity (S232). Here, if more than two links are detected, a list of the detected links can be sent to the upper management entity for link selection.

When the upper management entity determines to set up multiple links, a link setup request message, including a list of at least two links, can be sent to the MIH CS requesting for multiple link set up (S233). Here, the priority of the list of the links can be based on a policy determined by the manager or some other policy. In the embodiment of FIG. 17, the 3GPP cellular network has the highest priority, followed by the wireless LAN network of IEEE 802.11 and the broadband wireless access network of IEEE 802.16. This order of priority is merely an example and can be arranged in different order.

After receiving the link setup request message, the MIH CS can carry out the link set up procedures sequentially the links in the order provided in the message. That is, the MIH CS can send a message commanding the MIH of each interface to carry out link set up (S234, S235, S236). Thereafter, the MIH of each link can communicate with the entities below the MAC layer, including the MAC layer, and can carry out the link setup procedure (S237).

If the link set up is successful, the MIH of each link can send a message to the MIH CS notifying that the link set up is successful (S238, S239, S240). Preferably, the message sent to the MIH CS includes the mobility management protocol determined during the link setup procedure. The steps S238, S239, and S240 do not represent the order in which the link set up is performed, but the steps are performed sequentially. As such, the messages are sent in order of successful link set up.

More specifically, the MIH of the broadband wireless access network can send a message to the MIH CS to notify that the broadband wireless access network is successfully linked (S238). Similarly, the MIH of the cellular network can notify the MIH CS that the link has been successfully established (S239). Moreover, the MIH of the wireless LAN network can send a message to the MIH CS notifying that the wireless LAN network is successfully linked (S240).

The MIH CS can select one established link from a plurality of successfully established links according to the priority preference sent from the upper management entity during the link setup procedure was being carried out (S241). Here, the link selection can be based on the priority transmitted from the upper management entity or based on service durability according to the types of mobility management entities determined during the link set up procedure. In FIG. 17, the cellular network has the highest priority and therefore, the link is established with the cellular network.

The MIH CS can then notify to the upper management entity that link set up procedure is completed (S242). Furthermore, the MIH CS can also notify that the link set up procedure is completed to the mobility management entity (S243).

Figure 18:
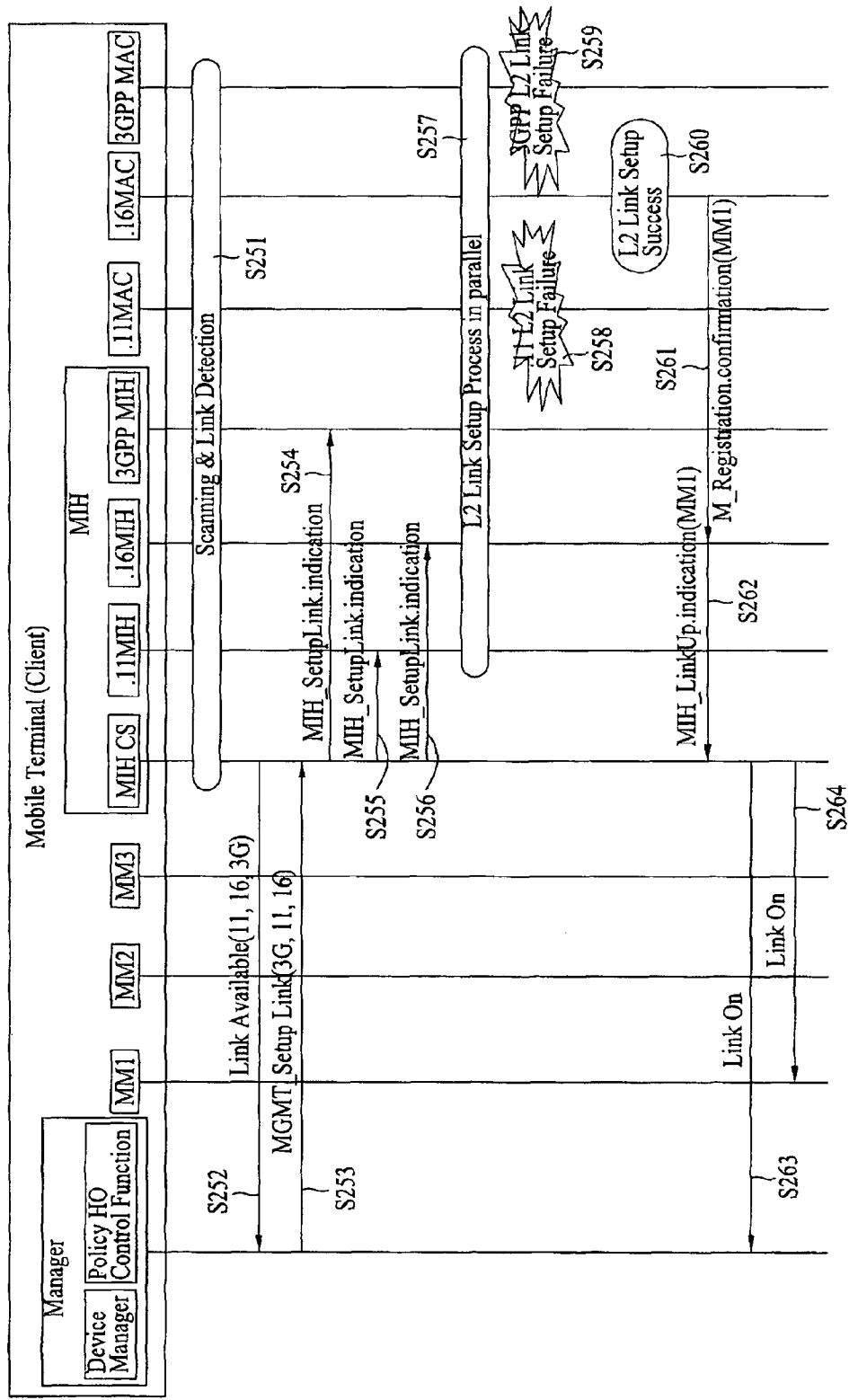
FIG. 18 is a flowchart of a procedure according to another embodiment of the present invention.

FIG. 18 is a flowchart of a procedure according to another embodiment of the present invention. More specifically, FIG. 18 illustrates a procedure in which the link set up procedure performed sequentially by the MIH CS is unsuccessful.

Each interface of the multi-mode mobile terminal can perform link detection procedure (S251). The result of the link detection can be transmitted to the MIH CS via the MIH of each link. Thereafter, the MIH CS can notify the received results of the link detection to the upper management entity (S252). Here, if more than two links are detected, a list of the detected links can be sent to the upper management entity for link selection.

When the upper management entity determines to set up multiple links, a link setup request message, including a list of at least two links, can be sent to the MIH CS requesting for multiple link set up (S253). Here, the priority of the list of the links can be based on a policy determined by the manager or some other policy. In the embodiment of FIG. 18, the 3GPP cellular network has the highest priority, followed by the wireless LAN network of IEEE 802.11 and the broadband wireless access network of IEEE 802.16. This order of priority is merely an example and can be arranged in different order.

After receiving the link setup request message, the MIH CS can carry out the link set up procedures sequentially the links in the order provided in the message. That is, the MIH CS can send a request message to the MIH of each link interface requesting for link set up sequentially without order preference (S254, S255, S256). In detail, the step S254 relates to the MIH CS making a request to the MIH of the cellular network for a link set up with the cellular network. The step S255 relates to the MIH CS making a request to the MIH of the wireless LAN network for a link set up with the wireless LAN network. The step S256 relates to the MIH CS making a request to the MIH of the broadband wireless access network for a link set up with the wireless broadband wireless access network.

The MIH of each link can communicate with the entities below the MAC layer, including the MAC layer, and performs the link set up procedure (S257). In the embodiment of FIG. 18, the link set up procedures of the wireless LAN network and the cellular network fails during the link set up procedure of each link (S258, S259) while the link set up procedure of the broadband wireless access network succeeds (S260). Whether the link set up is successful or not can be determined based on the elapsed time using the timer by the MIH CS or based on a message notifying the outcome of the link set up procedure via the MIH of the wireless LAN network.

The MAC layer of the broadband wireless access network can notify the MIH layer of the broadband wireless access network of the successful link set up (S261). Thereafter, the MIH of the broadband wireless access network can notify the MIH CS of the successful link set up (S262). The MIH CS then notifies the upper management entity that the link set up with the broadband wireless access network is successful (S263). Lastly, the MIH CS can also notify the mobility management entity of the successful link set up of the broadband wireless access network (S264).

Figure 19:
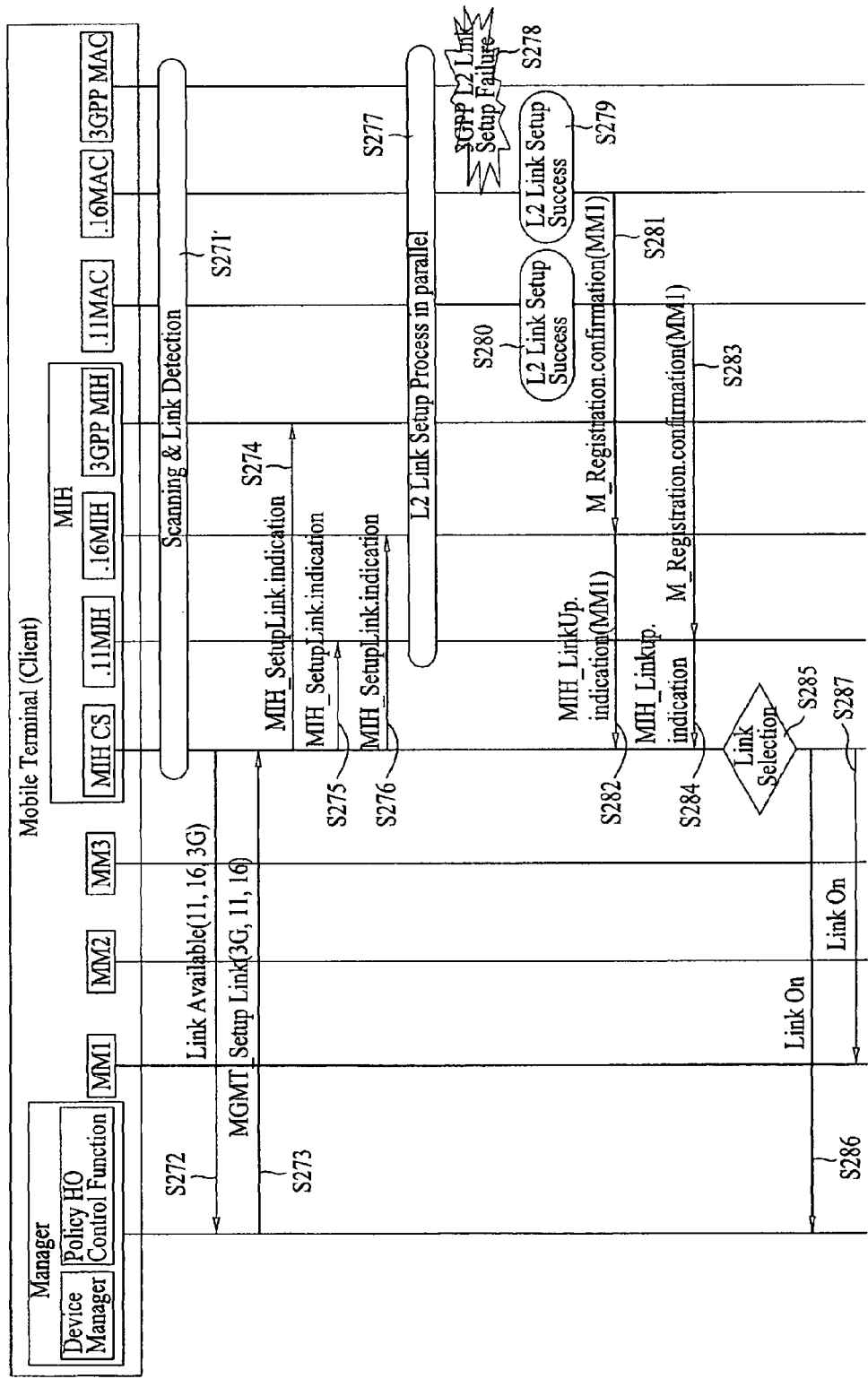
FIG. 19 is a flowchart of a procedure according to another embodiment of the present invention.

FIG. 19 is a flowchart of a procedure according to another embodiment of the present invention. More specifically, FIG. 19 illustrates a procedure for link selection according to a policy when the link set up fails.

Each interface of the multi-mode mobile terminal can perform link detection procedure (S271). The result of the link detection can be transmitted to the MIH CS via the MIH of each link. Thereafter, the MIH CS can notify the received results of the link detection to the upper management entity (S272). Here, if more than two links are detected, a list of the detected links can be sent to the upper management entity for link selection.

When the upper management entity determines to set up multiple links, a link setup request message, including a list of at least two links, can be sent to the MIH CS requesting for multiple link set up (S273). Here, the priority of the list of the links can be based on a policy determined by the manager or some other policy. In the embodiment of FIG. 19, the 3GPP cellular network has the highest priority, followed by the wireless LAN network of IEEE 802.11 and the broadband wireless access network of IEEE 802.16. This order of priority is merely an example and can be arranged in different order.

After receiving the link setup request message, the MIH CS can carry out the link set up procedures sequentially the links in the order provided in the message. That is, without preference to the order, the MIH CS can send a request message to the MIH of the cellular network to request for link set up with the cellular network (S274), to the MIH of the wireless LAN network to request for link set up with the wireless LAN network (S275), and to the MIH of the broadband wireless access network to request for link set up with the broadband wireless access network (S276).

The MIH of each link can communicate with each entity below the MAC layer, including the MAC layer, and performs the link set up procedure (S257). In the embodiment of FIG. 19, the result of the link set up with the cellular network is a failure (S278), but the link set up with wireless LAN network and the broadband wireless access network is successful (S279, S280). Whether the link set up is successful or not can be determined based on the elapsed time using the timer by the MIH CS or based on a message notifying the outcome of the link set up procedure via the MIH of the wireless LAN network.

The MAC layer of the broadband wireless access network can notify the MIH layer of the broadband wireless access network of the successful link set up (S281). Thereafter, the MIH of the broadband wireless access network can notify the MIH CS of the successful link set up (S282).

The MAC layer of the wireless LAN network can notify the MIH layer of the wireless LAN network of the successful link set up (S283). Thereafter, the MIH of the wireless LAN network can notify the MIH CS of the successful link set up (S282).

The MIH CS can select a link from the notified link established links (S285). Here, the link selection can be based on the priority transmitted from the upper management entity or based on service durability according to the types of mobility management entities determined during the link set up procedure. In FIG. 19, the wireless LAN network is given the highest priority by the upper management entity and is therefore selected.

The MIH CS can then notify to the upper management entity that link set up procedure is completed (S286). Furthermore, the MIH CS can also notify that the link set up procedure is completed to the mobility management entity (S287).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a handover to at least a homogeneous or heterogeneous network in a multi-mode mobile terminal, the method comprising:
receiving a first message from an upper layer module of the multi-mode mobile terminal to command power up at a media independent handover (MIH) module,
wherein the first message indicates a specified link to be powered up, and
wherein the MIH module is configured to converge information received from at least one network interface module of the multi-mode mobile terminal corresponding to at least the homogeneous or heterogeneous network into a unified presentation to be provided to the upper layer module;
sending a second message to power up the specified link to one of the at least one network interface module upon receipt of the first message, wherein the one of the at least one network interface module corresponds to the specified link;
performing a powering up operation on the one of the at least one network interface module; and
transmitting a confirmation message from the one of the at least one network interface module for indicating a status of the powering up operation to the MIH module.

2. The method of claim 1, wherein performing the powering up operation comprises powering on the one of the at least one network interface module for establishing a connection.

3. The method of claim 2, wherein establishing the connection comprises performing a link detection operation and a scanning operation.

4. The method of claim 1, wherein the specified link is selected from among at least one non-established link.

5. The method of claim 1, wherein the status comprises information including results of the powering up operation.

6. The method of claim 1, wherein the MIH module communicates with the at least one network interface module through a medium access control (MAC) sublayer management entity or a network control management system.

7. The method of claim 6, wherein the network control management system supports a management function of the multi-mode mobile terminal and is a layer in an independent management entity.

8. The method of claim 6, wherein the MAC sublayer management entity is included in a MAC layer and provides layer management service interfaces through which layer management functions are invoked.

9. The method of claim 1, wherein the at least one network interface module comprises at least a wireless local area network interface module or a wireless metropolitan area network interface module.

10. The method of claim 1, wherein the at least one network interface module comprises at least a Wideband Code Division Multiple Access (WCDMA) interface module or a Code Division Multiple Access 2000 (CDMA2000) interface module.

11. The method of claim 1, wherein the MIH module communicates with the at least one network interface module through a management service access point and a control service access point.

12. The method of claim 1, wherein the MIH module communicates with the at least one network interface module through a medium access control (MAC) sublayer management entity or a physical layer management entity.

13. The method of claim 1, wherein the second message includes an original primitive for the one of the at least one network interface module.

14. A method of performing a handover to at least a homogeneous network or heterogeneous network in a multi-mode mobile terminal, the method comprising:
receiving a first message from an upper layer module of the multi-mode mobile terminal to command power up at a media independent handover (MIH) module,
wherein the first message indicates a specified link to be powered up, and
wherein the MIH module is configured to converge information received from at least one network interface module of the multi-mode mobile terminal corresponding to at least the homogeneous network or heterogeneous network into a unified presentation to be provided to the upper layer module;
transmitting a second message for powering up and establishing a connection on the specified link upon receipt of the first message, wherein the second message is transmitted from the MIH module to the at least one network interface module; and
receiving a confirmation message in the MIH module for indicating a status of the powering up and the establishing the connection from the at least one network interface module.

15. A multi-mode mobile terminal for performing a handover to at least a homogeneous or heterogeneous network, the multi-mode mobile terminal comprising:
a media independent handover (MIH) module configured to converge information received from at least one network interface module of the multi-mode mobile terminal corresponding to at least the homogeneous network or heterogeneous network into a unified presentation to be provided to an upper layer module of the multi-mode mobile terminal,
wherein the MIH module receives a first message from the upper layer module to command power up of a specified link,
wherein the MIH module sends a second message to power up the specified link to one of the at least one network interface module upon receipt of the first message, wherein the one of the at least one network interface module corresponds to the specified link,
wherein the MIH module receives a confirmation message from the one of the at least one network interface module as a result of performing a powering up operation on the one of the at least one network interface module, the confirmation message indicating a status of the powering up operation, and
wherein the powering up operation is performed upon receipt of the second message at the one of the at least one network interface module.

16. The multi-mode mobile terminal of claim 15, wherein performing the powering up operation comprises powering on the one of the at least one network interface module for establishing a connection.

17. The multi-mode mobile terminal of claim 16, wherein the establishing the connection comprises performing a link detection operation and a scanning operation.

18. The multi-mode mobile terminal of claim 15, wherein the specified link is selected from among at least one non-established link.

19. The multi-mode mobile terminal of claim 15, wherein the status comprises information including results of the powering up operation.

20. The multi-mode mobile terminal of claim 15, wherein the MIH module communicates with the at least one network interface module through a medium access control (MAC) sublayer management entity or a network control management system.

21. The multi-mode mobile terminal of claim 20, wherein the network control management system supports a management function of the multi-mode mobile terminal and is a layer in an independent management entity.

22. The multi-mode mobile terminal of claim 20, wherein the MAC sublayer management entity is included in a MAC layer and provides layer management service interfaces through which layer management functions are invoked.

23. The multi-mode mobile terminal of claim 15, wherein the at least one network interface module comprises at least a wireless local area network interface module or a wireless metropolitan area network interface module.

24. The multi-mode mobile terminal of claim 15, wherein the at least one network interface module comprises at least a Wideband Code Division Multiple Access (WCDMA) interface module or a Code Division Multiple Access 2000 (CDMA2000) interface module.

25. The multi-mode mobile terminal of claim 15, wherein the MIH module communicates with the at least one network interface module through a management service access point and a control service access point.

26. The multi-mode mobile terminal of claim 15, wherein the MIH module communicates with the at least one network interface module through a medium access control (MAC) sublayer management entity or a physical layer management entity.

27. The multi-mode mobile terminal of claim 15, wherein the second message includes an original primitive for the one of the at least one network interface module.

* * * * *